US008222754B1

(12) United States Patent
Soliman et al.

(10) Patent No.: US 8,222,754 B1
(45) Date of Patent: Jul. 17, 2012

(54) VIBRATION-BASED POWER GENERATOR

(75) Inventors: Mostafa Soliman, Waterloo (CA);
Eihab Mohamed Abdel-Rahman, Waterloo (CA); Raafat R. Mansour, Waterloo (CA); Ehab Fahmy El-Saadany, Waterloo (CA)

(73) Assignee: Arjae Spectral Enterprises Ltd., Waterloo (CA)

( * ) Notice: Subject to any disclaimer, the term of this patent is extended or adjusted under 35 U.S.C. 154(b) by 341 days.

(21) Appl. No.: 12/473,895

(22) Filed: May 28, 2009

Related U.S. Application Data

(60) Provisional application No. 61/071,957, filed on May 28, 2008.

(51) Int. Cl.
*F03D 5/04* (2006.01)
(52) U.S. Cl. ....................................................... 290/1 R
(58) Field of Classification Search .................. 290/1 R; 322/3
See application file for complete search history.

(56) References Cited

U.S. PATENT DOCUMENTS

| 7,112,911 | B2* | 9/2006 | Tanaka et al. | 310/309 |
| 7,245,062 | B2* | 7/2007 | Schmidt | 310/330 |
| 7,843,090 | B2* | 11/2010 | Roberts et al. | 310/25 |
| 2007/0007770 | A1* | 1/2007 | Jager et al. | 290/1 R |
| 2009/0195222 | A1* | 8/2009 | Lu et al. | 322/3 |
| 2009/0230924 | A1 | 9/2009 | Wright | |
| 2009/0315335 | A1* | 12/2009 | Ujihara et al. | 290/1 R |

OTHER PUBLICATIONS

Amirtharajah et al.: "Self-Powered Signal Processing Using Vibration-Based Power Generation", Published May 1998, IEEE Journal of Solid-State Circuits, vol. 33, No. 5, pp. 687-695.
Arnold, David P.: "Review of Microscale Magnetic Power Generation", Published Nov. 2007, IEEE Transactions on Magnetics, vol. 43, No. 11, pp. 3940-3951.
Beeby et al.: "A Micro Electromagnetic Generator for Vibration Energy Harvesting", Published Jun. 5, 2007, Journal of Micromechanics and Microengineering, pp. 1257-1265, United Kingdom.
Beeby et al.: "Experimental Comparison of Macro and Micro Scale Electromagnetic Vibration Powered Generators", Published Jan. 16, 2007, Microsystem Technoly, vol. 13, pp. 1647-1653.
Burrow et al.: "A Resonant Generator with Non-Linear Compliance for Energy Harvesting in High Vibrational Environments", Published 2007, IEEE, pp. 715-720, United Kingdom.
Burrow et al.: "Vibration Energy Harvesters with Non-Linear Compliance", Published 2008, Proc. of SPIE vol. 6928, 692807-1 to 692807-10, United Kingdom.

(Continued)

*Primary Examiner* — Tho D Ta
(74) *Attorney, Agent, or Firm* — Osler, Hoskin & Harcourt LLP

(57) ABSTRACT

A vibration-based power generator has a variable stiffness oscillator connected to a base. The oscillator comprises an inertial mass moving relative to the base in response to vibrations. The oscillator has a neutral position corresponding to a position of the oscillator when no vibrations are transmitted to the base. The oscillator has a first position where the mass is at a first distance and a second position where the inertial mass is at a second distance from a position of the mass when the oscillator is in neutral position. The second distance is greater than the first distance. A stiffness of the oscillator at the second position is greater than a stiffness of the oscillator at the first position. A transducer generating electric power in response to movement of the inertial mass is associated with the oscillator. A method of optimizing a vibration-based power generator is also presented.

28 Claims, 25 Drawing Sheets

OTHER PUBLICATIONS

Li et al.: "A Micromachined Vibration-Induced Power Generator for Low Power Sensors of Robotic Systems", Published Jun. 2000, World Automation Congress, 8th International Symposium on Robotics with Applications, Hawaii.

Mann et al.: "Energy Harvesting from the Nonlinear Oscillations of Magnetic Levitation", Published Jul. 11, 2008, Journal of Sound and Vibration, vol. 319 (2009), pp. 515-530.

Pan et al.: "Fabrication and Analysis of a Magnetic Self-Power Microgenerator", Published Mar. 3, 2006, Journal of Magnetism and Magnetic Materials, vol. 304 (2006), pp. e394-e396.

Sari et al.: "A Wideband Electromagnetic Micro Power Generator for Wireless Microsystems", Published 2007, The 14th International Conference on Solid-State Sensors, Actuators and Microsystems, Jun. 10-14, 2007, IEEE, pp. 275-278.

Sari et al.: "An Electromagnetic Micro Power Generator for Wideband Environmental Vibrations", Published Nov. 26, 2007, Sensors and Actuators, A145-146 (2008), pp. 405-413.

Sasaki et al.: "Vibration-Based Automatic Power-Generation System", Published May 11, 2005, Microsystem Technology, vol. 11 (2005), pp. 965-969.

Serre et al.: "Vibrational Energy Scavenging with Si Technology Electromagnetic Inertial Microgenerators", Published Feb. 13, 2007, Microsystem Technology, vol. 13 (2007), pp. 1655-1661.

Spreemann et al.: "Non-Resonant Vibration Conversion", Published Aug. 9, 2006, Journal of Micromechanics and Microengineering, vol. 16 (2006), pp. S169-S173, United Kingdom.

Wang et al.: "Design, Fabrication and Performance of a New Vibration-Based Electromagnetic Micro Power Generator", Published Nov. 13, 2007, Microelectronics Journal, vol. 38 (2007), pp. 1175-1180.

Waters et al.: "Development of an Electro-Magnetic Transducer for Energy Harvesting of Kinetic Energy and its' Applicability to a MEMS-Scale Device", Published 2008, Nanopower Forum 2008, Jun. 2-4, 2008, California.

Williams et al.: "Analysis of a Micro-Electric Generator for Microsystems", Published 1996, Sensors and Actuators, vol. A52 (1996), pp. 8-11.

Arakawa et al.: "Micro Seismic Power Generator Using Electret Polymer Film", Published 2004, The Fourth International Workshop on Micro and Nanotechnology for Power Generation and Energy Conversion Applications Power MEMS 2004, Nov. 28-30, 2004, pp. 187-190, Kyoto, Japan.

Bartsch et al.: "Electrostatic Transducers for Micro Energy Harvesting Based on SOI Technology", Published 2007, The 14th International Conference on solid-State Sensors, Actuators and Microsystems, Jun. 10-14, 2007, IEEE, pp. 141-144.

Bartsch et al.: "Angewandtes "Micro Energy Harvesting"—Systemkonzept fur energieautarke Mikrosysteme", Published 2007, MST Kongr.

Bartsch et al.: "Elektromechanischer Energiewandler basierend auf SOI-Technologie", Published Jun. 3, 2007, Technisches Messen, vol. 12 (2007), pp. 636-641.

Hammad, Bashar K.: "Energy Harvesting Using Electrostatic Transduction", Published Feb. 15, 2007.

Chiu et al.: "MEMS Design and Fabrication of an Electrostatic Vibration-to-electricity Energy Converter", Published Jan. 4, 2007, Microsystem Technology, vol. 13 (2007), pp. 1663-1669.

Edamoto et al.: "Electret-Based Energy Harvesting Device with Parylene Flexible Springs", Published Jun. 2008, The 4th Asia Pacific Conference on Transducers and Micro/Nano Technologies (APCOT), Jun. 22-25, 2008.

Edamoto et al.: "Low-Resonant-Frequently Micro Electret Generator for Energy Harvesting Application", Published 2009, Proc. IEEE Int. Conf. MEMS 2009, Jan. 25-29, 2009, pp. 1059-1062.

Lo et al.: "Parylene-Based Electret Power Generators", Published Sep. 29, 2008, Journal of Micromechanics and Microengineering, vol. 18 (2008) 104006-104014, United Kindom.

Mahmoud et al.: "Modeling and Optimization of Planar Electret-Based Electrostatic Energy Harvester", Published 2007, 2007 ASME International Mechanical Engineering Congress and Exposition, Nov. 11-16, 2007, USA.

Marboutin et al.: "Optimal Design of Vibration-Driven Micro Electret Generator for Energy Harvesting", Published 2007, 7th Int. Workshop on Micro and Nanotechnology for Power Generation and Energy Conversion Applications (PowerMEMS 2007), pp. 141-144.

Meninger et al.: "Vibration-to-Electric Energy Conversion", Published Feb. 2001, IEEE Transactions on Very Large Scale Integration Systems, vol. 9, No. 1, pp. 64-76.

Mitcheson et al.: "Electrostatic Microgenerators", Published May 2008, MEAS Control-UK, vol. 41, No. 4, pp. 114-119.

Peano et al.: "Design and Optimization of a MEMS Electret-Based Capacitive Energy Scavenger", Published Jun. 2005, Journal of Microelectromechanical Systems, vol. 14, No. 3, pp. 429-435.

Peano et al.: "Nonlinear Oscillations in a MEMS Energy Scavenger", Published 2006, Mathematical and Computer Modelling, vol. 43 (2006), pp. 1412-1423.

Sakane et al.: "High-Performance Perfluorinated Polymer Electret Film for Micro Power Generation", Published 2007, 7th Int. Workshop on Micro and Nanotechnology for Power Generation and Energy Conversion Applications (PowerMEMS 2007), pp. 53-56.

Sakane et al.: "The Development of a High-Performance Perfluorinated Polymer Electret and its Application to Micro Power Generation", Published Sep. 29, 2008, Journal of Micromechanics and Microengineering, vol. 18 (2009) 104011-104017.

Sterken et al.: "An Electret-Based Electrostatic µ-Generator", Published 2003, The 12th International Conference on Solid State Sensors, Actuators and Microsystems, Jun. 8-12, 2003, IEEE, pp. 1291-1294.

Sterken et al.: "Harvesting Energy from Vibrations by a Micromachined Electret Generator", Published 2007, The 14th International Conference on Solid State Sensors, Actuators and Microsystems, Jun. 10-14, 2007, IEEE, pp. 129-132.

Suzuki et al.: "Micromachined High-Aspect-Ratio Parylene Spring and its Application to Low-Frequency Accelerometers", Published Oct. 5, 2006, Journal of Microelectromechanical Systems, vol. 15, No. 5, pp. 1364-1370.

Suzuki et al.: "Micro Electret Energy Harvesting Device with Analogue Impedance Conversion Circuit", Published 2008, Proceedings of PowerMEMS 2008+microEMS 2008, Nov. 9-12, 2008, Japan, pp. 7-10.

Suzuki, Yuji: "Energy Harvesting from Vibration Using Polymer Electret", Published 2008, IEEE Int. Symp. Micro-NanoMechatoronics and Human Science, Nov. 6-9, 2008, pp. 180-183.

Tada, Yasufusa: "Experimental Characteristics of Electret Generator, Using Polymer Film Electrets", Published Mar. 1992, Jpn. J. Appl. Phys. vol. 31, pp. 846-851.

Tashiro et al.: "Development of an Electrostatic Generator that Harnesses the Motion of a Living Body (Use of a Resonant Phenomenon)", Published 2000, JSME International Journal, Series C., vol. 43, No. 4, pp. 916-922.

Mahmoud, Mohamed A.: "Planar Electret-Based Electrostatic MEMS Micro-Generator", Published 2006, University of Waterloo, Canada.

Tsutsumino et al.: "High-Performance Polymer Electret for Micro Seismic Generator", Published 2005, The Fifth International Workshop on Micro and Nanotechnology for Power Generation and Energy conversion Applications PowerMEMS2005, pp. 9-12, Japan.

Tsutsumino et al.: "Seismic Power Generator Using High-Performance Polymer Electret", Published Jun. 2006, Proc. Int. Conf. MEMS06, pp. 98-101, Istanbul.

Tsutsumino et al.: "Micro Seismic Electret Generator for Energy Harvesting", Published 2006, The Sixth International Workshop on Micro and Nanotechnology for Power Generation and Energy Conversion Applications PowerMEMS2006, Nov. 29-Dec. 1, 2006, pp. 279-282, USA.

Tsutsumino et al.: "Electromechanical Modeling of Micro Electret Generator for Energy Harvesting", Published 2007, Proc. 14th Int. Conf. Solid-State Sensors, Actuators and Microsystems, vol. 2, pp. 863-866.

Geir Whist Tvedt et al.: "Simulation of an Electrostatic Energy Harvester at Large Amplitude Narrow and Wide Band Vibrations", Published 2008, DTIP 2008, Apr. 9-11, 2008, France.

Anton et al.: "A Review of Power Harvesting Using Pezoelectric Materials (2003-2006)", Published May 18, 2007, Smart Materials and Structures, vol. 16 (2007), pp. R1-R21, United Kingdom.

Challa et al.: "A Vibration Energy Harvesting Device with Bidirectional Resonance Frequency Tunability", Published Jan. 8, 2008, Smart Materials and Structures, vol. 17 (2008) 015035-015045, United Kingdom.

Dutoit et al.: "Design Considerations for MEMS-Scale Piezoelectric Mechanical Vibration Energy Harvesters", Published Jul. 1, 2005, Integrated Ferroelectrics, 71:1, pp. 121-160.

Dutoit et al.: "Performance of Microfabricated Piezoelectric Vibration Energy Harvesters", Published Nov. 1, 2006, Integrated Ferroelectrics, 83:1, pp. 13-32.

Erturk et al.: "Issues in Mathematical Modeling of Piezoelectric Energy Harvesters", Published Oct. 22, 2008, Smart Materials and Structures, vol. 17 (2008) 065016-065030, United Kingdom.

Erturk et al.: "On Mechanical Modeling of Cantilevered Piezoelectric Vibration Energy Harvesters", Published 2007, Journal of Intelligent Material Systems and Structures vol. 00.

Erturk et al.: "A Distributed Parameter Electromechanical model for Cantilevered Piezoelectric Energy Harvesters", Published Aug. 2008, Journal of Vibration and Acoustics vol. 130, pp. 041002-1 to 041002-15.

Erturk et al.: "A Piezomagnetoelastic Structure for Broadband Vibration Energy Harvesting", Published 2009, Applied Physics Letters, vol. 94, 254102.

Ferrari et al.: "Piezoelectric Multifrequency Energy Converter for Power Harvesting in Autonomous Microsystems", Published Aug. 17, 2007, Sensors and Actuators, A142 (2008), pp. 329-335.

Glynne-Jones et al.: "Towards a Piezoelectric Vibration-Powered Microgenerator", Published Mar. 2001, IEE Proc.-Sci. Meas. Technol., vol. 148, No. 2, pp. 68-72.

Granstrom et al.: "Energy Harvesting from a Backpack Instrumented with Piezoelectric Shoulder Straps", Published Sep. 5, 2007, Smart Materials and Structures, vol. 16 (2007), pp. 1810-1820, United Kingdom.

Lai et al.: "Vibration Powered Battery-Assisted Passive RFID Tag" [online], Published 2005, Retrieved from the Internet: <URL:http://www.springerlink.com/content/7w7816404401n33q/>.

Lefeuvre et al.: "A Comparison Between Several Vibration-Powered Piezoelectric Generators for Standalone Systems", Published Dec. 15, 2005, Sensors and Actuators, vol. A126 (2006), pp. 405-416.

Leland et al.: "A Self-Powered Wireless Sensor for Indoor Environmental Monitoring", Published 2004, Wireless Networking Symposium, Oct. 20-22, 2004, The University of Texas.

Leland et al.: "Resonance Tuning of Piezoelectric Vibration Energy Scavenging Generators Using Compressive Axial Preload", Published Sep. 8, 2006, Smart Materials and Structures, vol. 15 (2006), pp. 1413-1420, United Kingdom.

Lesieutre et al.: "Damping as a Result of Piezoelectric Energy Harvesting", Published 2004, Journal of Sound and Vibration, vol. 269 (2004), pp. 991-1001.

Liao et al.: "Model of a Single Mode Energy Harvester and Properties for Optimal Power Generation", Published Nov. 6, 2008, Smart Materials and Structures, vol. 17 (2008) 065026-065040, United Kingdom.

Liao et al.: "Optimal Parameters and Power Characteristics of Piezoelectric Energy Harvesters with an RC Circuit", Published Mar. 18, 2009, Smart Materials and Structures, vol. 18 (2009) 045011-045022, United Kingdom.

Liu, Yiming: "Active Energy Harvesting", Published Dec. 2006, The Pennsylvania State University.

Liu et al.: "A MEMS-Based Piezoelectric Power Generator Array for Vibration Energy Harvesting", Published Feb. 20, 2008, Microelectronics Journal, vol. 39 (2008), pp. 802-806.

Liu et al.: "Active Piezoelectric Energy Harvesting: General Principle and Experimental Demonstration", Published Oct. 24, 2008, Journal of Intelligent Material Systems and Structures, vol. 20—Mar. 2009, pp. 575-585.

Mo et al.: "Theoretical Analysis of Energy Harvesting Performance for Unimorph Piezoelectric Benders with Interdigitated Electrodes", Published Apr. 14, 2009, Smart Materials and Structures, vol. 18 (2009) 055017-055025, United Kingdom.

Ottman et al.: "Adaptive Piezoelectric Energy Harvesting Circuit for Wireless Remote Power Supply", Published Sep. 2002, IEEE Transactions on Power Electronics, vol. 17, No. 5, pp. 669-676.

Platt et al.: "On Low-Frequency Electric Power Generation With PZT Ceramics", Published Apr. 2005, IEEE/ASME Transactions on Mechatronics, vol. 10, No. 2, pp. 240-252.

Reilly et al.: "Thin Film Piezoelectric Energy Scavenging Systems for Long Term Medical Monitoring", Published 2006, IEEE, pp. 38-41.

Renaud et al.: "Scavenging Energy from Human Body: Design of a Piezoelectric Transducer", Published 2005, The 13th International Conference on Solid-State Sensors, Actuators and Microsystems, Jun. 5-9, 2005, IEEE, Korea, pp. 784-787.

Renaud et al.: "Piezoelectric Harvesters and MEMS Technology: Fabrication, Modeling and Measurements", Published 2007, The 14th International Conference on Solid-State Sensors, Actuators and Microsystems, IEEE, pp. 891-894.

Renaud et al.: "Fabrication, Modelling and Characterization of MEMS Piezoelectric Vibration Harvesters", Published Nov. 19, 2007, Sensors and Actuators, vol. A145-146 (2008), pp. 380-386.

Renno et al.: "On the Optimal Energy Harvesting from a Vibration Source", Published 2008, Journal of Sound and Vibration.

Roundy et al.: "Vibration-Based Energy Scavenging for Pervasive Computing: New Designs and Research that Increase Power Output" [online], Retrieved from the Internet: <URL:http://vertex.berkeley.edu/our_lab/publications/PervasiveComputingFinal.doc>.

Roundy et al.: "Improving Power Output for Vibration-Based Energy Scavengers", Published 2005, Pervasive Computing, IEEE, pp. 28-36.

Roundy et al.: "Energy Scavenging in Support of Ambient Intelligence—Techniques, Challenges, and Future Directions", Published 2006, Amlware, pp. 265-284, Netherlands.

Shahruz, S.M.: "Design of Mechanical Band-Pass Filters with Large Frequency Bands for Energy Scavenging", Published 2006, Mechatronics, vol. 16 (2006), pp. 523-531.

Shahruz, S.M.: "Design of Mechanical Band-Pass Filters for Energy Scavenging: Multi-Degree-of-Freedom Models", Published 2008, Journal of Vibration and Control, SAGE Publications, pp. 753-768.

Shahruz, S.M.: "Increasing the Efficiency of Energy Scavengers by Magnets", Published Oct. 2008, Journal of Computational and Nonlinear Dynamics, vol. 3, ASME, pp. 041001-1 to 041001-12.

Shahruz, S.M.: "Performance of Mechanical Bandpass Fitters Used in Energy Scavenging in the Presence of Fabrication Errors and Coupling", Published Oct. 2008, Journal of Vibration and Acoustics, vol. 130, ASME, pp. 054505-1 to 054505-9.

Shahruz et al.: "Performance of Mechanical Band-Pass Filters Used in Energy Scavenging in the Presence of Fabrication Errors and Coupling", Published 2007, 2007 ASME International Mechanical Engineering Congress and Exposition, Nov. 15-17, 2007, USA.

Youngsman et al.: "A Model for an Extensional Mode Resonator Used as a Frequency-Adjustable Vibration Energy Harvester", Published 2009, Journal of Sound and Vibration.

D'Hulst et al.: "Energy Scavengers: Modeling and Behavior with Different Load Circuits", Published 2007, The 33rd Annual Conference of the IEEE Industrial Electronics Society (IECON), Nov. 5-8, 2007, Taiwan, IEEE, pp. 2169-2174.

Huang et al.: "Reverse Breakdown Voltage Measurement for Power P+NN+ Rectifier", Published Jan. 11, 2008, J Electron Test, vol. 24 (2008), pp. 473-479.

Mur Miranda, Jose Oscar "Electrostatic Vibration-to-Electric Energy Conversion", Published Feb. 2004, Massachusetts Institute of Technology.

Mitcheson et al.: "Performance Limits of the Three MEMS Inertial Energy Generator Transduction Types", Published Aug. 31, 2007, Journal of Micromechanics and Microengineering, vol. 17 (2007), pp. S211-S216, United Kingdom.

Meninger, Scott: "A Low Power Controller for a MEMS Based Energy Converter", Published Jun. 1999, Massachusetts Institute of Technology.

Shu et al.: "Analysis of Power Output for Piezoelectric Energy Harvesting Systems", Published Sep. 25, 2006, Smart Materials and Structures, vol. 15 (2006), pp. 1499-1512, United Kingdom.

Shu et al.: "Efficiency of Energy Conversion for a Piezoelectric Power Harvesting System", Published Sep. 29, 2006, Journal of Micromechanics and Microengineering, vol. 16 (2006), pp. 2429-2438, United Kingdom.

Shu et al.: "An Improved Analysis of the SSHI Interface in Piezoelectric Energy Harvesting", Published Oct. 9, 2007, Smart Materials and Structures, vol. 16 (2007), pp. 2253-2264, United Kingdom.

Tan et al.: "Comparative Study of Non-Standard Power Diodes", Published 2009, ICIEA, IEEE, pp. 3307-3314.

Torres et al.: "Electrostatic Energy Harvester and Li-Ion Charger Circuit for Micro-Scale Applications", Published 2006, IEEE Midwest Symposium on Circuits and Systems (MWSCAS), San Juan, Puerto Rico, Aug. 2006.

Torres et al.: "Energy-Harvesting System-in-Package Microsystem", Published Dec. 2008, Journal of Energy Engineering, pp. 121-129.

Beeby et al.: "Energy Harvesting Vibration Sources for Microsystems Applications", Published Oct. 26, 2006, Measurement Science and Technology, vol. 17 (2006), pp. R175-R195, United Kingdom.

"Energy Harvesting Projects", Works in Progress, Published 2005, Pervasive Computing, IEEE, pp. 69-71.

Halvorsen, Einar: "Energy Harvesters Driven by Broadband Random Vibrations", Published Sep. 3, 2008, Journal of Microelectromechanical Systems, vol. 17, No. 5, Oct. 2008, pp. 1061-1071.

Leland et al.: "Energy Scavenging Power Sources for Household Electrical Monitoring", Published 2006, Proceedings Power MEMS, pp. 165-168.

Mur Miranda, Jose Oscar: "Electrostatic Vibration-to-Electric Energy Conversion", Published Feb. 2004, Massachusetts Institute of Technology.

Mitcheson et al.: "Architectures for Vibration-Driven Micropower Generators", Published Jun. 2004, Journal of Microelectromechanical Systems, vol. 13, No. 3, IEEE, pp. 429-440.

Mitcheson et al.: "Performance Limits of the Three MEMS Inertial Energy Generator Transduction Types", Published Aug. 31, 2007, Journal of Micromechanics and Microengineering, vol. 17 (2007), pp. 5211-5216, United Kingdom.

Mitcheson et al.: "Energy Harvesting From Human and Machine Motion for Wireless Electronic Devices", Published Sep. 2008, Proceedings of the IEEE, vol. 96, No. 9, pp. 1457-1486.

Nakano et al.: "A Unified Approach to Optimal Conditions of Power Harvesting Using Electromagnetic and Piezoelectric Transducers", Published May 29, 2007, Smart Materials and Structures, vol. 16 (2007), pp. 948-958, United Kingdom.

Ostrem et al.: "An Assessment of the Common Carrier Shipping Environment", Published 1979, Forest Products Laboratory, Forest Service, U.S. Department of Agriculture.

Paradiso et al.: "Energy Scavenging for Mobile and Wireless Electronics", Published 2005, Pervasive Computing, IEEE, pp. 18-27.

Philipose et al.: "Battery-Free Wireless Identification and Sensing", Published 2005, Pervasive Computing, IEEE, pp. 37-45.

Quinn et al.: "Vibration-Based Energy Harvesting with Essential Nonlinearities", Published 2007, Proceedings of the ASME 2007 International Design Engineering Technical Conferences & Computers and Information in Engineering Conference, Sep. 4-7, 2007, USA.

Roundy Shadrach Joseph: "Energy Scavenging for Wireless Sensor Nodes with a Focus on Vibration to Electricity Conversion", Published 2003, University of California, Berkeley.

Stephen, N. G.: "On Energy Harvesting from Ambient Vibration", Published 2006, Journal of Sound and Vibration, vol. 293 (2006), pp. 409-425.

Sterken et al.: "Comparative Modelling for Vibration Scavengers", Published 2004, IEEE, pp. 1249-1252.

Sterken et al.: "Motion-Based Generators for Industrial Applications", Published 2006, DTIP, Apr. 26-28, 2006, Italy.

Sundararajan et al.: "Wireless Sensor Networks for Machinery Monitoring", Published 2005, 2005 ASME International Mechanical Engineering Congress and Exposition, Nov. 5-11, 2005, USA.

Yang et al.: "Electromagnetic Energy Harvesting from Vibrations of Multiple Frequencies", Published Jan. 30, 2009, Journal of Micromechanics and Microengineering, vol. 19 (2009) 035001-035009, United Kingdom.

Yuen et al.: "An AA-Sized Vibration-Based Microgenerator for Wireless Sensors", Published 2007, Pervasive Computing, pp. 64-72.

"Modeling, Signal Processing, and Control II", Published 2008, SPIE Smart Structures and Materials & Nondestructive Evaluation and Health Monitoring, 15th Annual International Symposium, Mar. 9-13, 2008, San Diego, CA, USA.

* cited by examiner

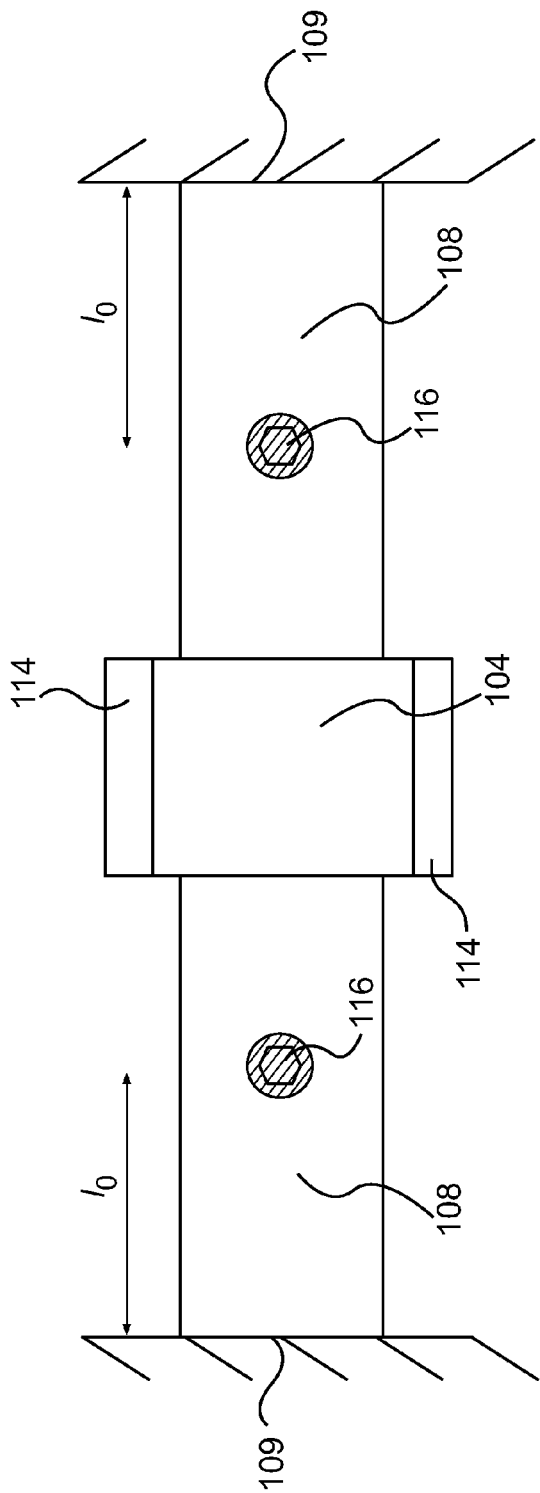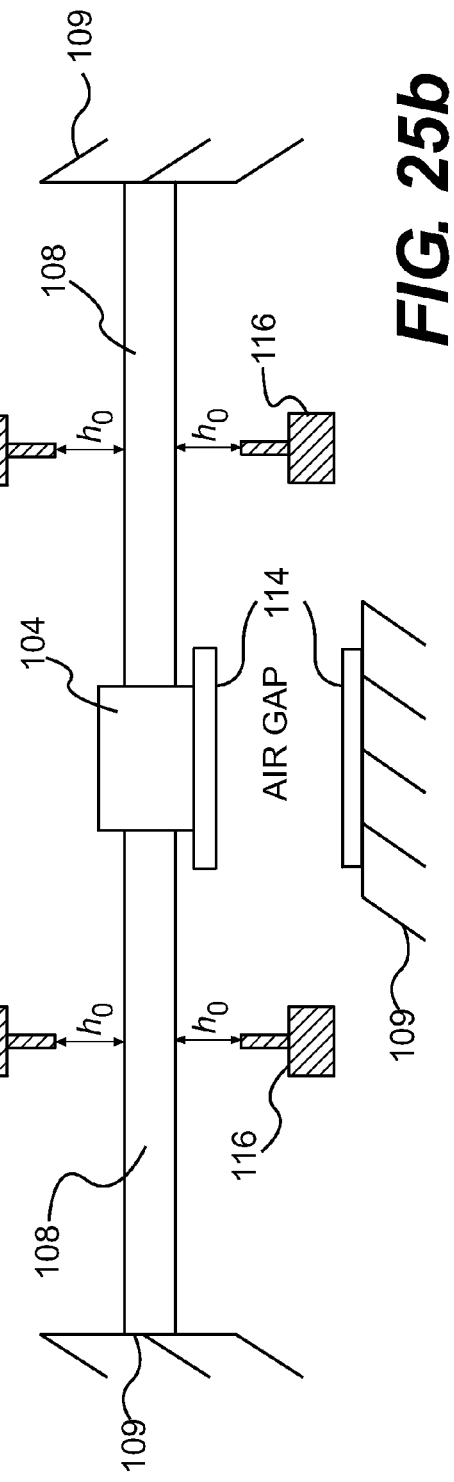
FIG. 25a
FIG. 25b

US 8,222,754 B1

VIBRATION-BASED POWER GENERATOR

CROSS-REFERENCE

This application claims priority from U.S. Provisional Application No. 61/071,957, filed May 28, 2008, the entirety of which is incorporated by reference.

FIELD OF THE INVENTION

The present invention is related to an apparatus for energy harvesting, more specifically for harvesting energy from waste or environmental vibrations.

BACKGROUND OF THE INVENTION

Batteries are the power source of choice for many sensor systems. Maintenance, replacement, and disposal of batteries are expensive, time consuming, and environmentally hazardous tasks for large sensor networks. In fact, these tasks are practically impossible to perform for embedded sensors, such as those embedded inside structures (bridges, roads, buildings) or airframes. Using micro-power generators (MPGs) to recharge batteries or alternative energy storage devices is an effective solution to this problem. In addition, MPGs can supply energy at higher levels than batteries which allows localized computing and enables new applications such as autonomous wireless sensor networks.

A MPG is a vibration-based apparatus consisting of an oscillator embodied by an inertial mass 4 attached to a spring 2, and of a mechanical damper 3 (FIG. 1). The spring 2 is attached to a housing 6, which is itself rigidly attached to a surface of a host body that experiences ground vibrations (typically a bridge, a car, or a bicycle). As a result, the housing 6 moves with the host body, and the inertial mass 4 moves with respect to the housing 6. A transducer 1 drains some of the apparent kinetic energy from the relative displacement of the inertial mass 4 and converts it to electric energy. The electric energy is routed through electric connectors 11 to a power conditioning circuit 22, and then to a storage device or an electric load 5.

MPGs are designed differently depending on their transduction mechanism. Common transduction mechanisms used in vibration-based MPG include electromagnetic, electrostatic, and piezoelectric mechanisms. For simplicity, similar elements of the MPGs described below with respect to FIGS. 2 to 4 have been labelled with the same reference numerals and will only be described once.

A typical electromagnetic MPG, such as shown in FIGS. 2a and 2b, consists of an inertial mass 4 and a coil 10 supported by a cantilever beam 8 attached to a wall or base 9 of the housing 6 (shown in FIG. 1) and moving in a magnetic field. The coil 10 and magnetic field combination constitutes the transduction mechanism; it ensures the drain of electric energy. The coil 10 is made of a large number of turns of a small gage copper wire or alternatively another conducting non-magnetic material. A system of four permanent magnets 13 maintains the magnetic field in the air gap. The magnets 13 are attached to the inside of a yoke 12 made of steel (or another ferromagnetic material) to increase the flux density in the air gap. Different arrangements of magnets 13 and support structures made of a magnetic material can also be used to maintain a high flux density magnetic field in the air gap (portion in phantom). The relative motion of the inertial mass 4 with respect to the housing 6 causes the beam 8 and the coil 10 it carries to oscillate in the air gap. As a result, an electric current flows through the coil 10 which dampens the relative motion of the beam 8-mass 4 system (or oscillator). Alternatively, the yoke 12 and magnets 13 can act as an inertial mass 4 carried by the beam 8 and move with respect to a fixed coil 10. In either case, the relative motion of the beam 8-mass 4 system is damped (energy is extracted) by the current flowing through the coil 10.

In a typical electrostatic MPG, such as shown in FIGS. 3a and 3b, the transducer consists of a variable capacitor supported by the beam 8. A voltage source (not shown) maintains a potential difference between the capacitor plates 14. The relative motion of the inertial mass 4 with respect to the housing 6 causes the beam 8 and the capacitor plate 14 it carries, to oscillate in the air gap. As a result, the capacitance of the capacitor changes, electric current flows through the circuit connected to the capacitor, and a capacitive force dampens the relative motion of the beam 8-mass 4 system. Alternatively, the capacitor plates 14 can be carried on flexible structures that move relative to the housing 6 which allow them to move with respect to each other. In either case, the relative motion of the beam 8-mass 4 system is damped (energy is extracted) by a capacitive force opposing the motion.

In a typical piezoelectric MPG, such as shown in FIGS. 4a and 4b, the transducer consists of a piezoelectric patch 15 attached to the beam 8. The relative motion of the inertial mass 4 with respect to the housing 6 creates stresses in the beam 8 and the piezoelectric patch 15. The patch 15 transforms this stress to a potential difference between the top and bottom sides of the patch 15. Alternatively, piezoelectric patches 15 can be attached on either side of the cantilever beam 8. In either case, the relative motion of the beam 8-mass 4 system is damped (energy is extracted) by a piezoelectric force opposing the motion.

All these embodiments use the motion of a linear oscillator (the beam 8-mass 4 system) generated by environmental vibrations to create electric energy. Regardless of the transduction mechanisms, the collected energy can be maximized by minimizing dissipation in the mechanical oscillator and parasitic losses in electric circuits, or by maximizing the inertial mass of the MPG to increase the input kinetic energy.

The usability of vibration-based MPGs is severely limited by the random nature of environmental vibrations. Vibration-based MPGs are tuned to harvest energy within a narrow frequency band in the neighborhood of a natural frequency of the oscillator (MPG bandwidth). Outside this band, the output power is too low to be conditioned and utilized. This limitation is exacerbated by the fact that MPGs are also designed to minimize energy dissipation, further narrowing the MPG bandwidth. On the other hand, vibrations in most environments are random and wideband. As a result, vibration-based MPGs can only harvest energy for a relatively limited fraction of time, which imposes excessive constraints on their usability.

Therefore, there is a need for a MPG which would increase the amount of collected energy by increasing the bandwidth of vibration frequencies that can be harvested.

SUMMARY OF THE INVENTION

It is an object of the present invention to ameliorate at least some of the inconveniences present in the prior art.

This invention provides a new concept of wideband vibration-based MPGs, henceforth dubbed MPG. The new MPG architecture expands the bandwidth of vibration-based energy harvesters by employing variable-stiffness oscillators as kinetic energy harvesting elements. These oscillators are designed to passively change their effective stiffness up and/ or down with the amplitude of ground/environmental vibration, thereby maintaining the oscillator in resonance and the MPG's harvested energy near maximum for a wider frequency band than was possible for an oscillator with a fixed/constant stiffness.

It is an object of the present invention to provide a wideband vibration-based MPG.

It is another object of the present invention to provide a method of optimizing such an MPG.

In one aspect, the invention provides a vibration-based power generator comprising a base and a variable stiffness oscillator connected to the base. The oscillator comprises an inertial mass. The inertial mass moves relative to the base in response to vibrations transmitted to the base. The oscillator has a neutral position corresponding to a position of the oscillator relative to the base when no vibrations are transmitted to the base. The oscillator has a first position where the inertial mass is at a first distance in a first direction from a position of the inertial mass when the oscillator is at the neutral position. The oscillator has a second position where the inertial mass is at a second distance in the first direction from the position of the inertial mass when the oscillator is at the neutral position, the second distance being greater than the first distance. A stiffness of the oscillator at the second position is greater than a stiffness of the oscillator at the first position. An electric energy transducer is associated with the oscillator. The electric energy transducer generates electric power in response to movement of the inertial mass relative to the base.

In a further aspect, the electric energy transducer has at least a portion connected to the oscillator.

In an additional aspect, the electric energy transducer is an electromagnetic transducer comprising at least one magnet and a coil, one of the at least one magnet and the coil being connected to the base, and an other one of the at least one magnet and the coil being connected to the oscillator.

In another aspect, the inertial mass is formed by the at least one magnet.

In a further aspect, the electric energy transducer is an electrostatic transducer comprising a capacitor having first and second capacitor plates, the first capacitor plate is connected to the base, and the second capacitor plate is connected to the oscillator and generally faces the first capacitor plate.

In an additional aspect, the electric energy transducer is a piezoelectric transducer comprising a piezoelectric patch connected to the oscillator.

In another aspect, the oscillator further comprises at least one spring connected to the inertial mass, the spring having one end connected to the base.

In a further aspect, the oscillator further comprises at least one stopper, the inertial mass contacting the at least one stopper when the oscillator is in the second position.

In an additional aspect, the inertial mass forms a portion of the electric energy transducer.

In another aspect, the at least one stopper is a spring.

In a further aspect, the base houses the oscillator. The oscillator further comprises a plate connected to the inertial mass and the at least one stopper. The plate is connected to the base via at least a pair of springs. The plate contacts the at least one stopper when the oscillator is in the second position.

In an additional aspect, the oscillator further comprises a beam connected to the inertial mass. The beam has one end connected to the base.

In another aspect, the beam is at least two beams.

In a further aspect, the beam has a cross-section which varies along a length of the beam.

In an additional aspect, the oscillator further comprises a first stopper. The beam contacts the first stopper when the oscillator is in the second position.

In another aspect, the at least one stopper is supported by a movable carriage.

In a further aspect, the oscillator further comprises a first stopper. The beam further comprises a ledge extending from the inertial mass. The ledge contacts the first stopper when the oscillator is in the second position.

In an additional aspect, the oscillator further comprises a first stopper. The first stopper contacts the inertial mass when the oscillator is in the second position.

In another aspect, the oscillator has a third position where the inertial mass is at a third distance in the first direction from the position of the inertial mass when the oscillator is at the neutral position. The third distance is greater than the second distance. A stiffness of the oscillator at the third position is greater than a stiffness of the oscillator at the second position. The oscillator further comprises a second stopper. The beam contacts the second stopper when the oscillator is in the third position.

In a further aspect, the beam comprises at least two beams.

In an additional aspect, the oscillator has a third position where the inertial mass is at a third distance in a second direction from the position of the inertial mass when the oscillator is at the neutral position. The oscillator has a fourth position where the inertial mass is at a fourth distance in the second direction from the position of the inertial mass when the oscillator is at the neutral position. The fourth distance is greater than the third distance. A stiffness of the oscillator at the fourth position is greater than a stiffness of the oscillator at the third position. The oscillator further comprises a second stopper. The beam contacts the second stopper when the oscillator is in the fourth position.

In another aspect, the beam is a first beam. The oscillator further comprises a second beam. The oscillator has a third position where the inertial mass is at a third distance in the first direction from a position of the inertial mass when the oscillator is at the neutral position. The oscillator has a fourth position where the inertial mass is at a fourth distance in the first direction from the position of the inertial mass when the oscillator is at the neutral position. The fourth distance is greater than the second distance. A stiffness of the oscillator at the fourth position is greater than a stiffness of the oscillator at the third position. The oscillator has a fifth position where the inertial mass is at a fifth distance in the second direction from the position of the inertial mass when the oscillator is at the neutral position. The oscillator has a sixth position where the inertial mass is at a sixth distance in the second direction from the position of the inertial mass when the oscillator is at the neutral position. The sixth distance is greater than the fifth distance. A stiffness of the oscillator at the sixth position is greater than a stiffness of the oscillator at the fifth position. The oscillator further comprises a third stopper and a fourth stopper. The second beam contacts the third stopper when the oscillator is in the fourth position. The second beam contacts the fourth stopper when the oscillator is in the sixth position.

It is also an object of the present invention to provide a method of optimizing a vibration-based power generator.

In another aspect the invention provides a method of optimizing a vibration-based power generator, the vibration-based power generator having a variable stiffness oscillator. The method comprises obtaining a probability density function of vibrations of an environment in which the power generator is to operate; obtaining a frequency-response function of the power generator; obtaining a figure of merit for the probability density function by convoluting the probability density function of the environment with the frequency-response function of the power generator; and adjusting the variable stiffness oscillator so as to optimize the figure of merit.

In a further aspect, adjusting the variable stiffness oscillator so as to optimize the figure of merit includes obtaining a figure of merit for different configurations of the variable stiffness oscillator, constituting a family of figures of merit, and selecting an absolute optimal from the family of figures of merit.

In an additional aspect, adjusting the variable stiffness oscillator so as to optimize the figure of merit includes obtaining a figure of merit for different configurations of the variable stiffness oscillator, constituting a family of figures of merit, and selecting a suboptimal from the family of figures of merit, the suboptimal having a wider range of frequencies than an absolute optimal of the family of figures of merit.

In another aspect, the variable stiffness oscillator comprises a cantilever beam connected to an inertial mass and having one end connected to a base, and a stopper for contacting one of the inertial mass and the cantilever beam at a point of impact while the cantilever beam is moving relative to the base. Adjusting the variable stiffness oscillator based on the figure of merit includes adjusting a position of the stopper along the cantilever beam.

In a further aspect, the variable stiffness oscillator is further adjusted by selecting a distance of the stopper to the cantilever beam that minimizes a velocity of the cantilever beam at the point of impact.

For purposes of this application, the term "beam" includes, but is not limited to, beam, plate, and tether.

Embodiments of the present invention each have at least one of the above-mentioned aspects, but do not necessarily have all of them. It should be understood that some aspects of the present invention that have resulted from attaining the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 3b is a side view of the electrostatic MPG of FIG. 3a;

FIG. 4b is a side view of the piezoelectric MPG of FIG. 4a;

FIG. 6b is a side view of the electromagnetic MPG of FIG. 6a;

FIG. 8b is a side view of the piezoelectric MPG of FIG. 8a;

FIG. 16b is a side view of the electromagnetic MPG of FIG. 16a;

FIG. 17b is a side view of the piezoelectric MPG of FIG. 17a;

FIG. 21b is a side view of the electromagnetic MPG of FIG. 21a;

FIG. 22b is a side view of the piezoelectric MPG of FIG. 22a;

FIG. 23b is a side view of the electrostatic MPG of FIG. 23a;

FIG. 24b is a side view of the electrostatic MPG of FIG. 24a;

FIG. 25a is a top view of a third version an electrostatic MPG according to the sixth embodiment of the invention;

FIG. 25b is a side view of the electrostatic MPG of FIG. 25a;

FIG. 26b is a side view of the electromagnetic MPG of FIG. 26a taken along the line 26b-26b of FIG. 26a;

FIG. 28b is a side view of the electrostatic MPG of FIG. 28a;

FIG. 29b is a side view of the electromagnetic MPG of FIG. 29a taken along the line 29b-29b of FIG. 29a.

DETAILED DESCRIPTION OF THE PREFERRED EMBODIMENTS

Figure 1:
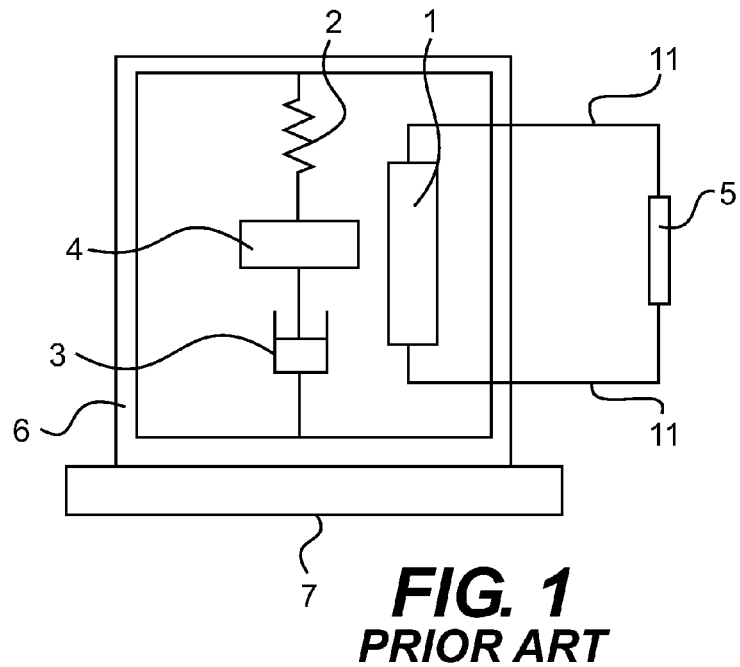
FIG. 1 is a schematic of a generic prior art vibration-based micro-power generator (MPG)

With reference to FIGS. 5a to 30, various embodiments of MPGs (or harvesters) will be described. For simplicity, elements of these embodiments which are similar to each other have been labelled with the same reference numerals and will be described only once, unless otherwise necessary.

Turning now to FIGS. 5a to 8b various embodiments of electromagnetic, electrostatic, and piezoelectric MPGs designed according to a first embodiment of the present invention will be described.

Figure 2A:
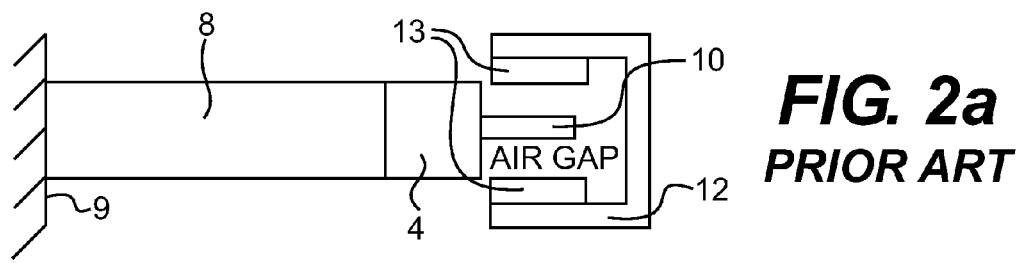
FIG. 2a is a top view of a prior art electromagnetic MPG.
Figure 2B:
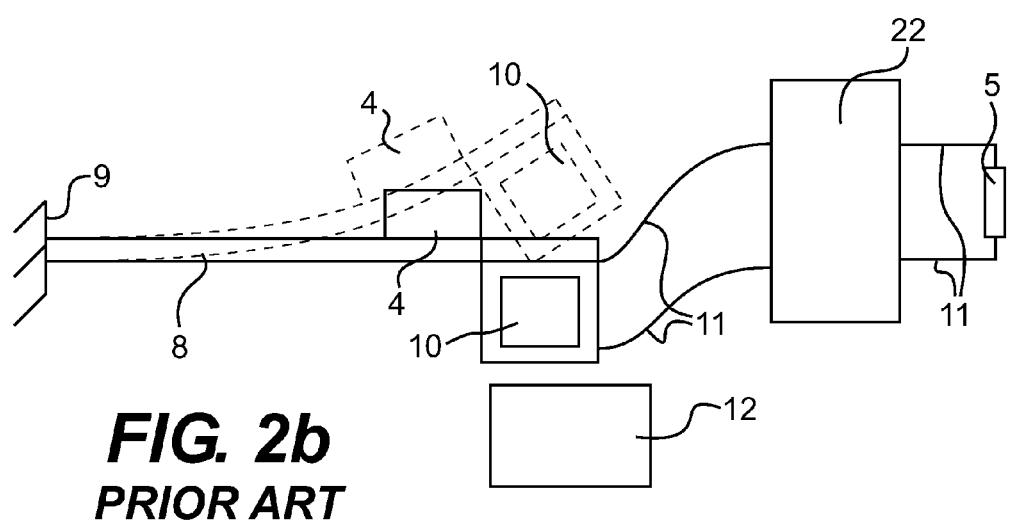
FIG. 2b is a side view of the electromagnetic MPG of FIG. 2a with a portion in phantom showing a position of the MPG in operation.
Figure 3A:
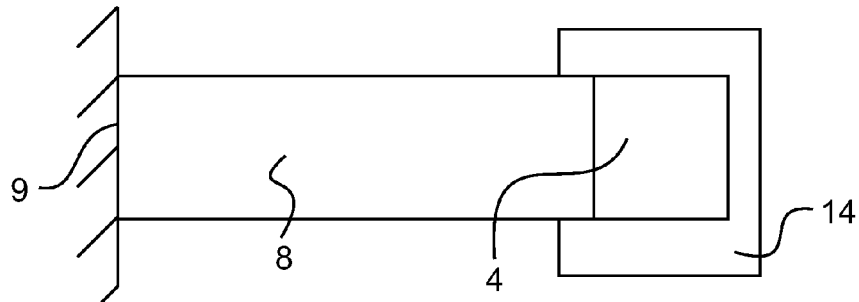
FIG. 3a is a top view of a prior art electrostatic MPG.
Figure 3B:
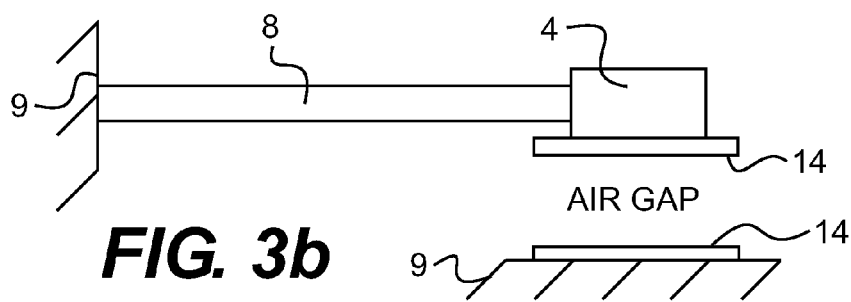
Figure 4A:
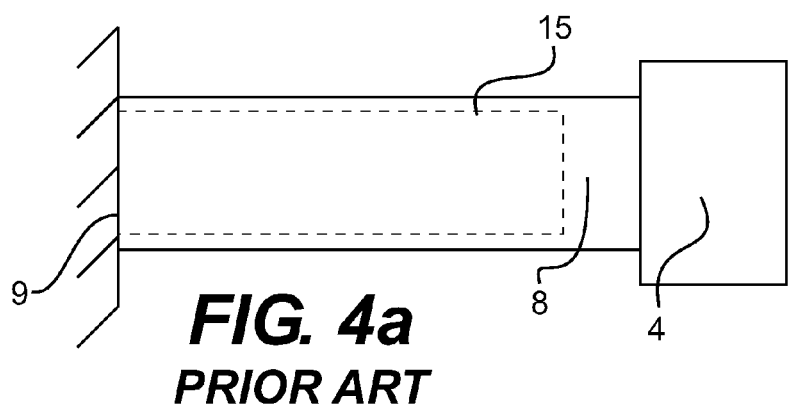
FIG. 4a is a top view of a prior art piezoelectric MPG.
Figure 4B:
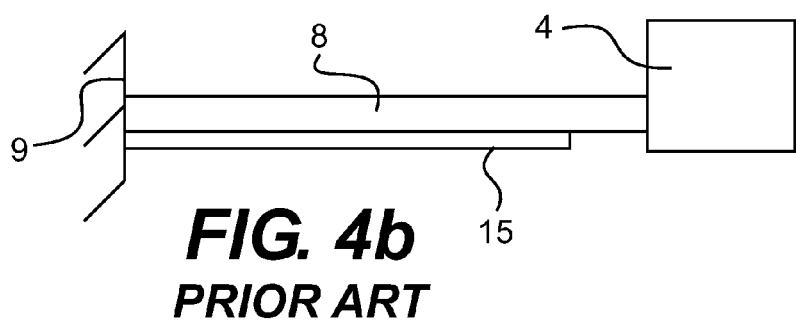
Figure 5A:
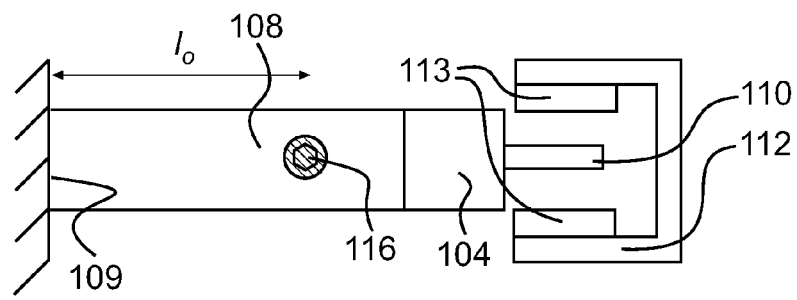
FIG. 5a is a top view of a first version of an electromagnetic MPG according to a first embodiment of the invention.
Figure 5B:
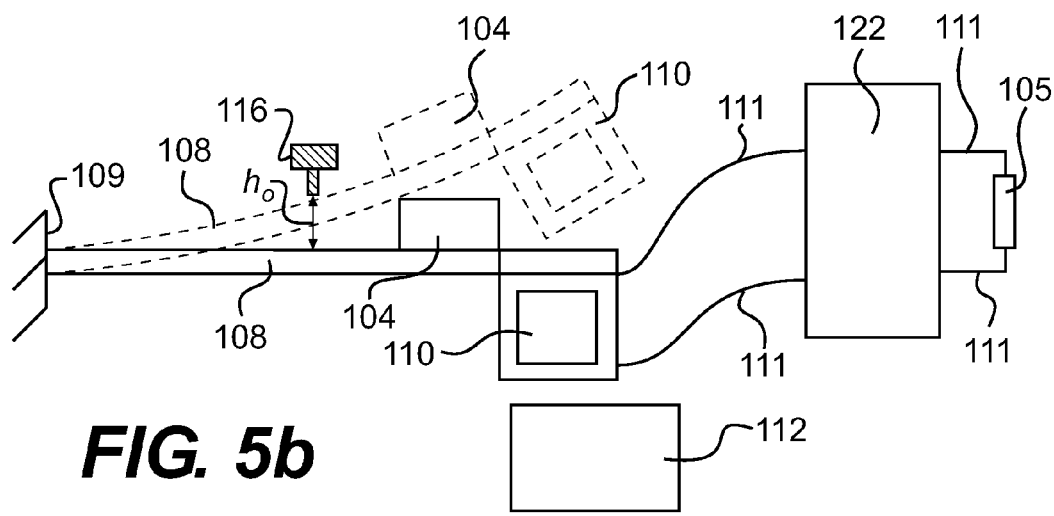
FIG. 5b is a side view of the electromagnetic MPG of FIG. 5a with a portion in phantom showing a position of the MPG when in contact with a stopper.

Referring to FIGS. 5a and 5b, an electromagnetic MPG according to the first embodiment consists of an inertial mass 104, a cantilever beam 108, a coil 110, and magnets 113 attached to a yoke 112, in a similar arrangement to the one described above in the prior art (FIGS. 2a and 2b). Alternatively, the inertial mass 104 could be made of a yoke 112 and magnets 113 assembly while the coil 110 could be stationary (such a version is shown in FIG. 10b). The energy produced by the coil 110 and magnet 113 arrangement is routed through electric connectors 111 to a power conditioning circuit 122 and then to a storage device or an electric load 105.

The electromagnetic MPG of the first embodiment of the invention, is further equipped with a subsystem consisting of a rigid stopper 116 in the vicinity of the moving cantilever beam 108. The stopper 116 is a bolt or a screw, but could be any element (flexible or rigid) that would interfere or stop the motion of the inertial mass 104 when the stopper 116 comes into contact with the beam 108.

Figure 9:
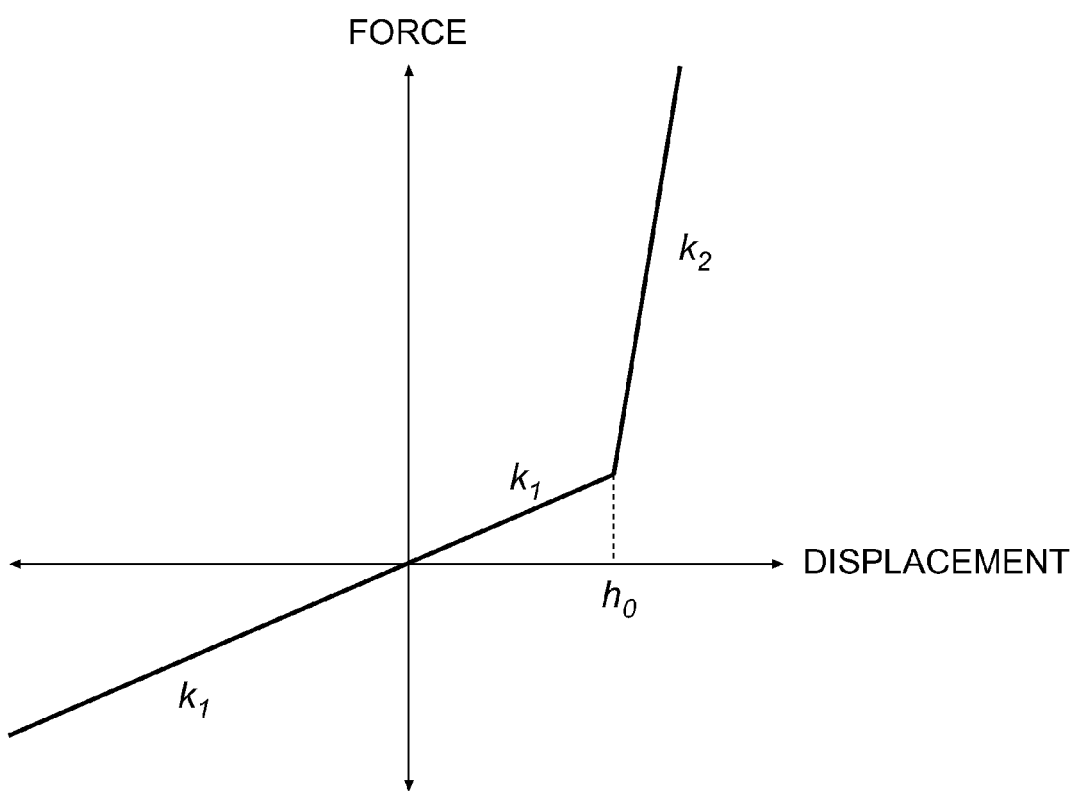
FIG. 9 is a plot illustrating the force versus displacement of a MPG according to the first embodiment of the invention.

The subsystem is used for extending the frequency domain where energy is harvested. The stopper 116 is positioned so that it interferes with the regular envelope of the beam 108 (or spring 102 depending on the design, see FIGS. 6a, 6b, 18a and 18b) motions resulting from ground vibrations. The stopper 116 engages the beam 108 when the amplitude of the oscillations is above a certain threshold. As a result of the contact of the moving beam 108 with the stopper 116, the effective length of the beam 108 is reduced from L to a shorter length $L-l_o$. This in turn changes the stiffness of the beam 108-mass 104 system. FIG. 9 shows the force versus beam displacement of a MPG equipped with a stopper 116 placed inside the envelope of motion of the beam 108. The stopper 116 creates a two-stage stiffness relationship, where displacements in a first stage face a softer resistance (embodied by a low stiffness $k_1$) and displacements in a second stage face a harder resistance (embodied by a higher stiffness $k_2$). This bi-linear stiffness relationship transforms the harvester from a linear oscillator (prior art) into a bi-linear oscillator.

Figure 5C:
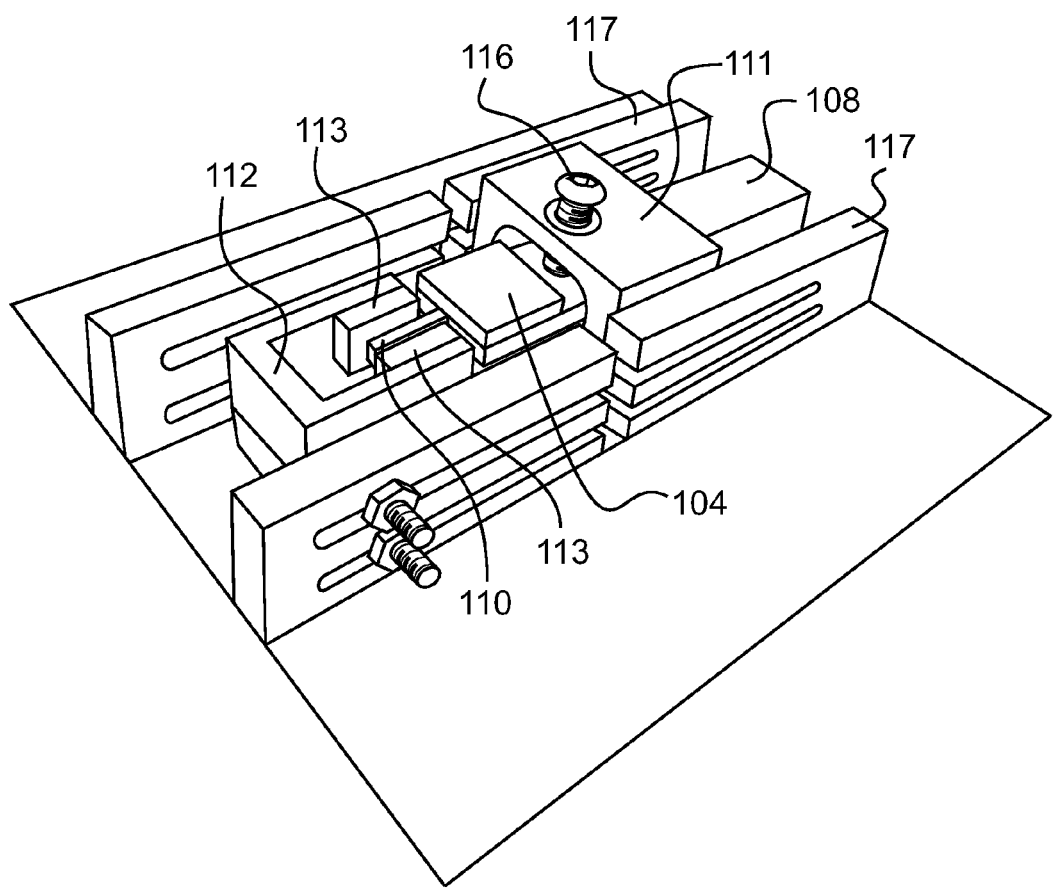
FIG. 5c is a perspective view of the electromagnetic MPG of FIG. 5a showing the stopper mounted on a carriage.

As shown in FIG. 5c, a carriage 111 moves along a pair of tracks 117 to place the stopper 116 at a fixed horizontal offset $l_o$ from a base 109 (or support) of the cantilever beam 108. A screw mechanism in the carriage 111 rigidly supports the stopper 116 at a fixed height $h_o$ with respect to the rest or neutral position of the cantilever beam 108. The height $h_o$ and fixed horizontal offset $l_o$ can be set to other values as per the design requirements. As it will be explained in more details below, a value of $h_o$ and $l_o$ influences a stiffness of the MPG, and a design methodology can be carried out to select an optimized pair ($h_o$, $l_o$). This first embodiment is well suited for meso-sized MPGs (i.e. gross dimensions of few to several centimeters in each direction).

Figure 6A:
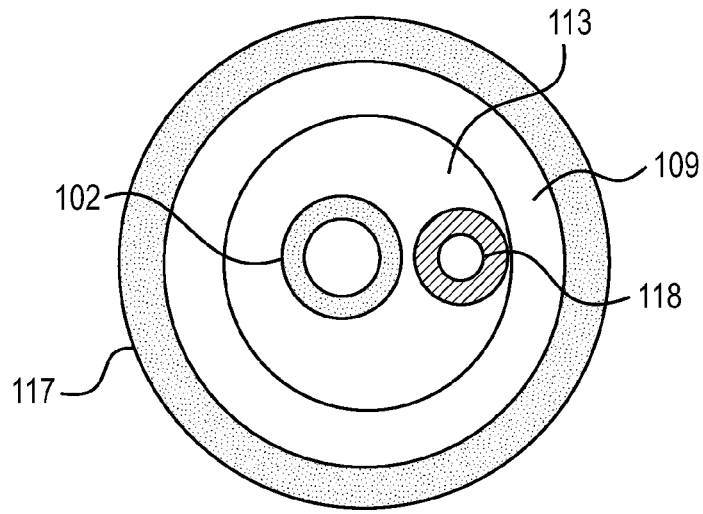
FIG. 6a is a top view a second version of an electromagnetic MPG according to the first embodiment of the invention.
Figure 6B:
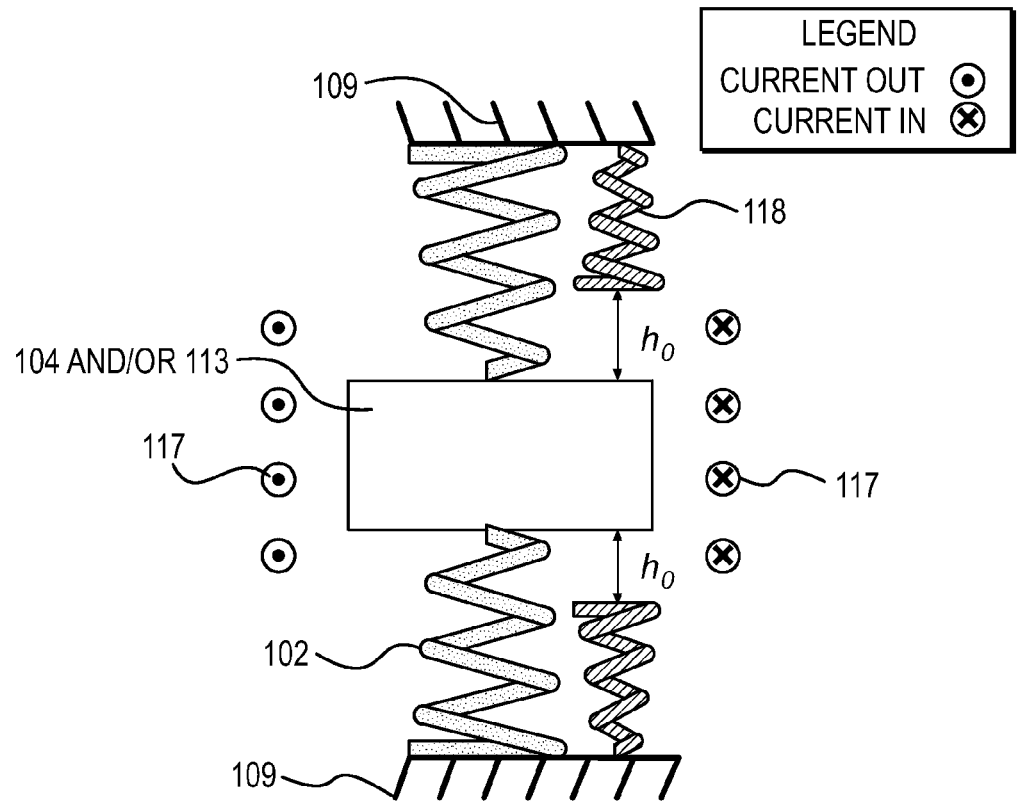

An alternative version of an electromagnetic MPG according to the first embodiment of the invention, shown in FIGS. 6a and 6b, uses two springs 102 in place of the cantilever beam 108. The springs 102 support a magnet 113 which acts as the inertial mass 104 of the MPG. In addition, the MPG is equipped with two more symmetrically arranged springs 118 that contact the magnet 113 when the strike exceeds a fixed amplitude $h_o$. Each spring 118 works as a variable resistance stopper 116. This alternative to the first embodiment is well suited for low frequency applications (below 50 Hz).

Figure 7A:
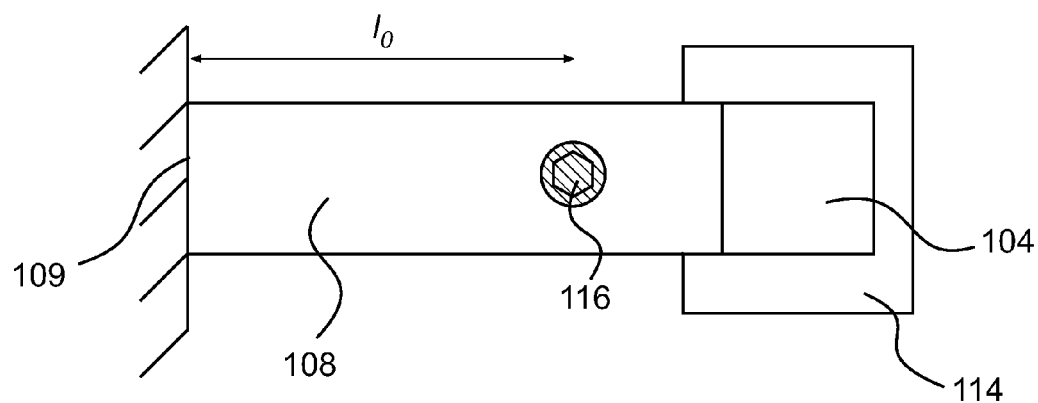
FIG. 7a is a top view of an electrostatic MPG according to the first embodiment of the invention.
Figure 7B:
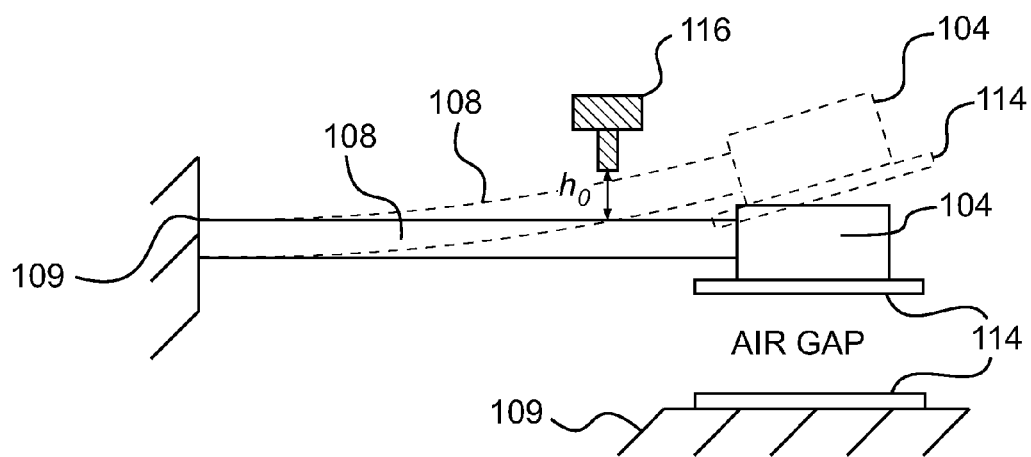
FIG. 7b is a side view of the electrostatic MPG of FIG. 7a with a portion in phantom showing a position of the MPG when in contact with a stopper.

Referring now to FIGS. 7a and 7b, an electrostatic MPG according to the first embodiment of the invention will be described. The electrostatic MPG uses a variable capacitor 114 as a transduction mechanism. The electrostatic MPG is equipped with the same subsystem consisting of the rigid stopper 116 placed in the vicinity of the moving beam 108 described above. The electrostatic MPG according to the first embodiment of the invention is well suited for micro-sized MPGs (i.e. gross dimensions of less than a centimeter in each direction).

Figure 8A:
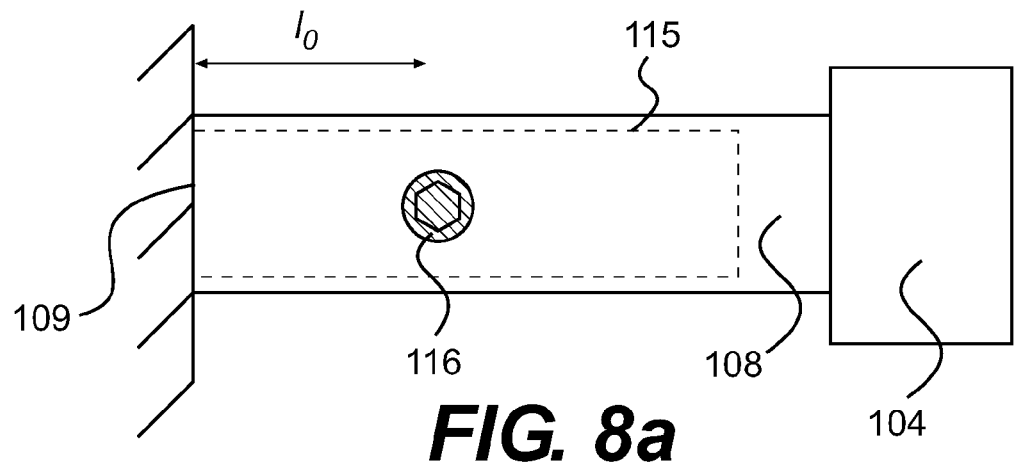
FIG. 8a is a top view of a piezoelectric MPG according to the first embodiment of the invention.
Figure 8B:
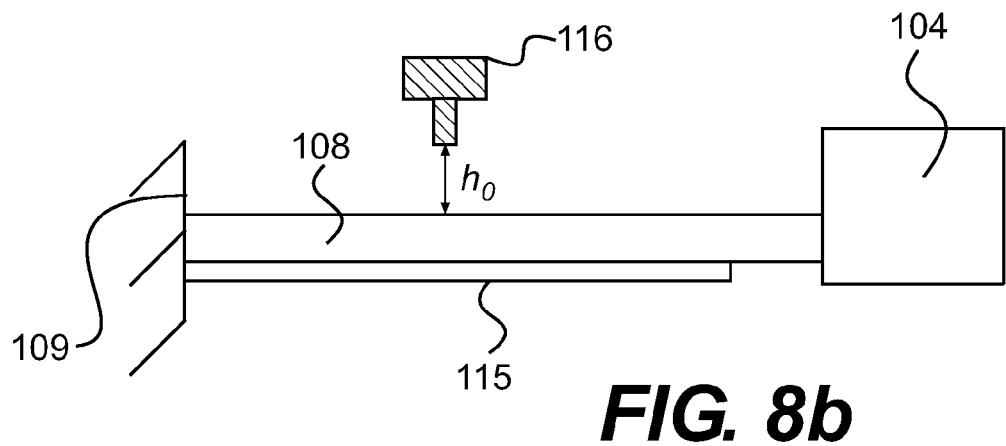

Referring now to FIGS. 8a and 8b, a piezoelectric MPG according to the first embodiment of the invention uses a piezoelectric patch 115 as the transduction mechanism. The piezoelectric MPG is equipped with the subsystem consisting of the rigid stopper 116 placed in the vicinity of the moving beam 108 as described above. The piezoelectric MPG according to the first embodiment of the invention is well suited for micro-sized MPGs (gross dimensions of less than a centimeter in each direction).

Figure 8C:
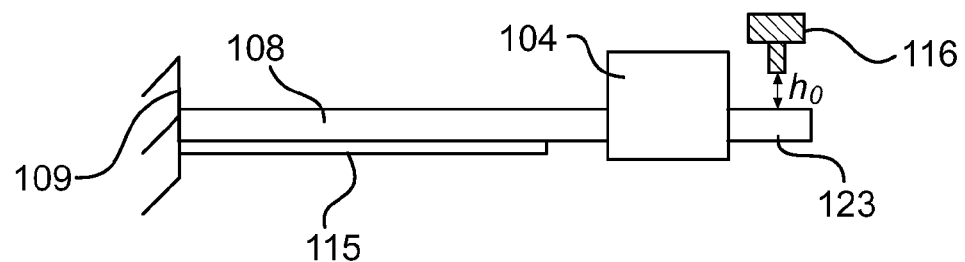
FIG. 8c is a side view of a piezoelectric MPG according to an alternative design of the first embodiment of the invention.

Alternatively, as shown in FIG. 8c, it is contemplated that in the case of the inertial mass 104 not being at a tip of the beam 108, the rigid stopper 116 could be placed within the envelope of motion of the cantilever beam ledge 123. That position has a similar effect to the stopper 116 being positioned directly within the envelope of motion of the beam 108, and in turns creates a bi-linear oscillator.

Figure 14:
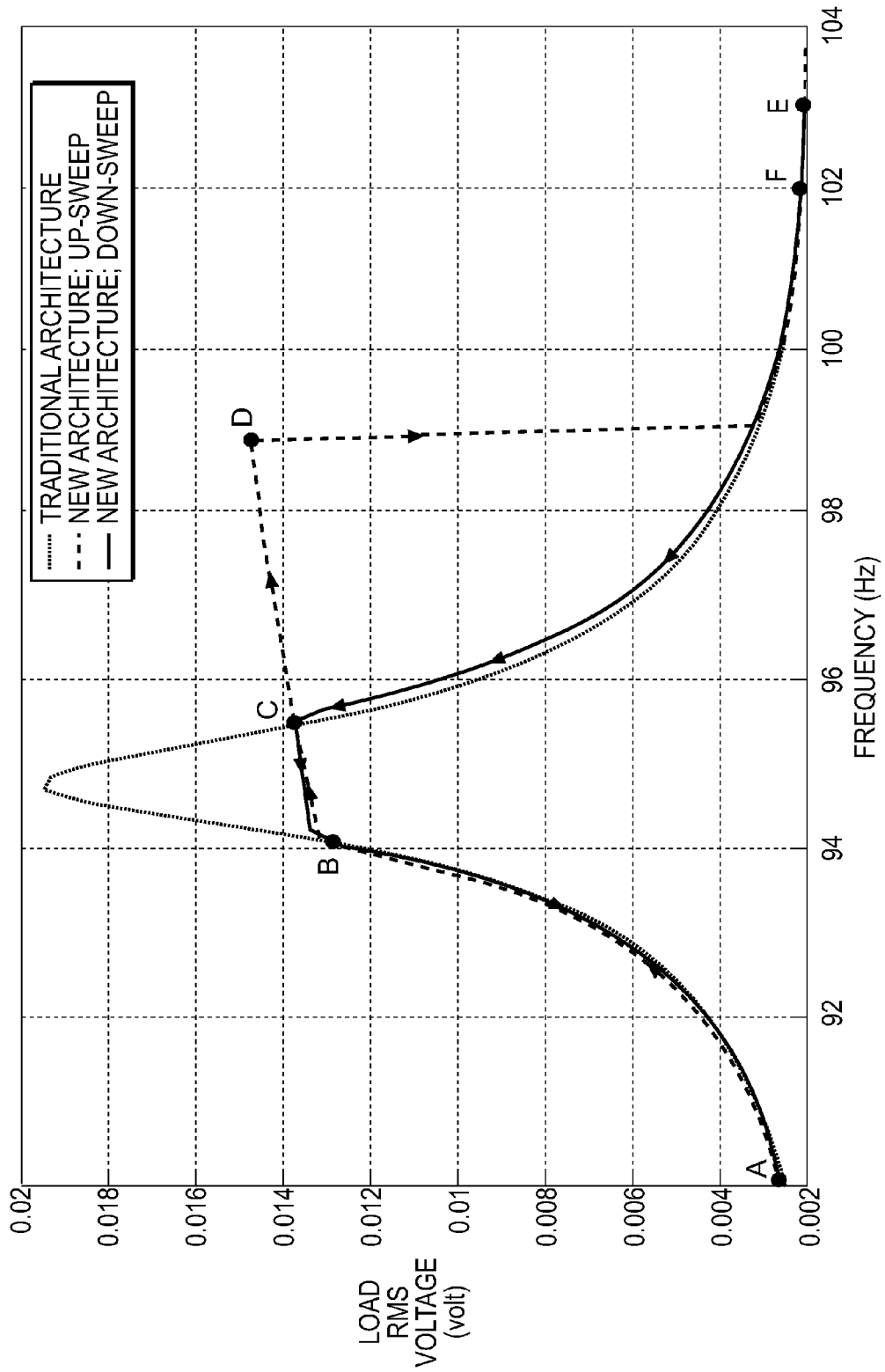
FIG. 14 is a plot of experimentally measured voltage across a resistive load of an electromagnetic MPG realized according to the prior art architecture (dashed line) and according to the invention, in a frequency up-sweep (dashed-dotted line) and a frequency down-sweep (solid line)

Typical frequency-response curves of the MPG according to the first embodiment (and regardless of the transduction mechanism) are shown in FIG. 14. More specifically, the variation of the root mean square (RMS) voltage across a resistive load 105 for an electromagnetic MPG according to the first embodiment and for a typical electromagnetic MPG of the prior art (shown in FIG. 1) is plotted against the frequency of environmental vibrations.

Starting at point A and sweeping up the frequency of the environmental vibrations, the RMS voltage across the load 105 increases monotonically and identically in the MPG according to the first embodiment and in the prior art MPG until point B. At point B, the slope of the frequency-response curve of the MPG according to the first embodiment drops abruptly as the cantilever beam 108 engages the stopper 116, while the frequency-response curve of the prior art MPG continues to increase smoothly. From point B to point D (up-sweep), the RMS of the load voltage of the first embodiment increases slowly as the speed at which the beam 108 engages the stopper 116 increases. At point D the RMS load voltage of the first embodiment MPG drops to match the level of the prior art MPG. The up-sweep bandwidth of the first embodiment MPG is equal to the difference between the locations of points B and D along the frequency spectrum and is larger than the bandwidth of the prior art MPG (the difference between the locations of points B and C). The responses of the first embodiment MPG and the prior art MPG are identical from this point up to point E.

Starting now at point F and sweeping down the frequency range, the RMS voltage of the resistive load increases monotonically and identically in the first embodiment MPG and in the prior art MPG from point F to point C. At point C, the slope of the frequency-response curve of the first embodiment MPG drops abruptly as the cantilever beam 108 engages the stopper 116, while the frequency-response curve of the prior art MPG continues to increase smoothly. An abrupt slope change is seen at point B in the frequency-response curve of the first embodiment MPG where it becomes once again identical to that of the prior art MPG from this point and onward for the rest of the down-sweep. The down-sweep bandwidth of the first embodiment MPG is equal to the difference between the locations of points B and C along the frequency spectrum and is, therefore, identical to the bandwidth of the prior art MPG.

The increase in the size of the up-sweep bandwidth over the down-sweep bandwidth depends on the stiffness ratio of the first to the second stages of the bi-linear spring in the first embodiment. As it will be seen below, a piecewise-linear oscillator can be made by having more than one stopper 116, resulting in an oscillator having more than two stiffness. In that case, the up-sweep bandwidth depends on the stiffness ratios of the first to second and first to third stages (or more) of the spring. In either case, as the stiffness ratio increases beyond unity the up-sweep bandwidth expands until it saturates at a maximum up-sweep bandwidth. The up-sweep bandwidth of the piecewise-linear MPG saturates to the maximum up-sweep bandwidth faster (the multiple stoppers of a piecewise-linear oscillator will need to interfere less with the envelope of beam motions) than the first embodiment.

The MPG according to the first embodiment delivers more power than the prior art MPG whenever the frequency of environmental vibrations varies from a value inside the down-sweep bandwidth in any pattern that includes values outside the down-sweep bandwidth. As shown in M. S. M. Soliman, E. M. Abdel-Rahman, E. F. El-Saadany, and R. R. Mansour, "A Wideband Vibration-Based Energy Harvester", Journal of Micromechanics and Microengineering, 2008, Vol. 18, paper #115021., the entirety of which is incorporated by reference, the MPG is robust to external disturbances in the up-sweep bandwidth. As a result, it can maintain these advantages under adverse conditions. However, the output power of this wideband MPG is less than the output power of the prior art MPG for environmental vibrations inside the down-sweep bandwidth (FIG. 14). Therefore, a design procedure is used to determine the stopper 116 height ho and offset distance lo that will allow the wideband MPG to collect a maximum energy for a given probability density function of the environmental vibrations frequency.

The design methodology is as follow: (i) minimizing mechanical and electrical energy losses via structural design, circuit, and material selection, (ii) minimizing the MPG non-contact damping ratio by increasing the inertial mass 104 and stiffness of the MPG linearly (while maintaining their ratio k/m fixed) until size effects cause the rate at which energy losses increase to accelerate to a rate higher than that linear rate, (iii) tailoring the output power and bandwidth to fit the probability density function of environmental vibrations. To do so, a figure of merit is devised to quantify the quality of this fit. In "Optimization of Energy Collection in Vibration-Based Micro-Power Generators" by M. S. M. Soliman, E. M. Abdel-Rahman, E. F. El-Saadany, and R. R. Mansour, enclosed in an appendix herein, an example of using this figure of merit to configure a wideband MPG constructed according to the first embodiment of this invention to fit a Gaussian probability density function with a standard deviation of 2.5 Hz is provided.

More specifically, to determine the figure of merit, one must first obtain the probability density function of the environment vibrations, before engaging the following iterative procedure. The stopper is fixed at a first position determined by its distance to the base 109 l1 and a nominal height above the beam h1 and the frequency response of the MPG having the stopper 116 in that position is obtained, The frequency response is convoluted with the probability density function to obtain a figure of merit (representing the probability of the MPG collecting environmental vibration energy) with respect to the frequencies of the environment vibrations. Once that figure of merit is determined, the stopper 116 is moved to another position. The probability density function and the figure of merit are re-calculated. Once the range of distances to the base 109 has been swept, a position that maximizes the figure of merit is selected. The optimization criteria can be twofold. It could be the absolute maximum of the convolution product, which in turn is the maximum energy collected, or a suboptimum of the convolution product, which collects less energy but allows a wider range of frequencies to be collected. The suboptimum is preferred when there is some uncertainty about the probability density function of environment vibrations. By this procedure the offset distance lo has been adjusted to a value slightly larger than the minimum threshold necessary for an up-sweep bandwidth that is larger than the bandwidth of the probability density function of environmental vibrations.

Once the offset distance lo from the support is determined, the stopper 116 height h1 is adjusted to minimize the velocity of the cantilever beam 108 at the point of impact, in order to minimize energy losses. To do so the stopper height ho is set as high as possible to minimize the impact velocity, while maintaining the up-sweep bandwidth larger or equal to the bandwidth of interest in the probability density function.

Figure 10A:
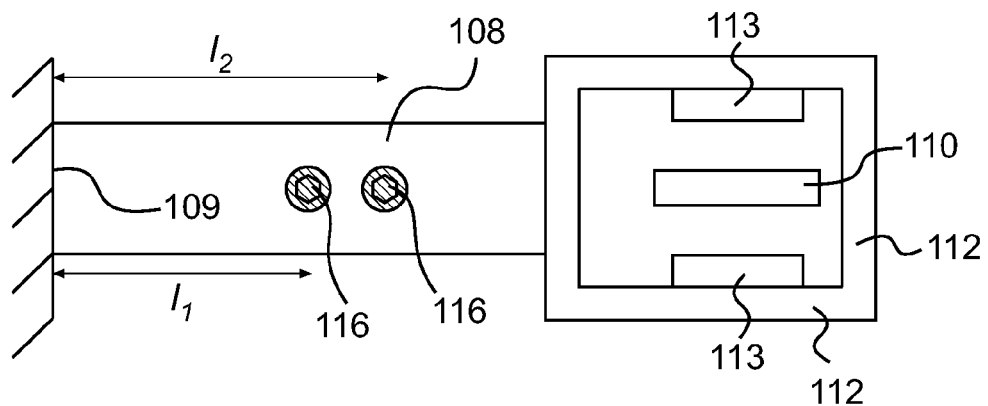
FIG. 10a is a top view of an electromagnetic MPG according to a second embodiment of the invention.
Figure 10B:
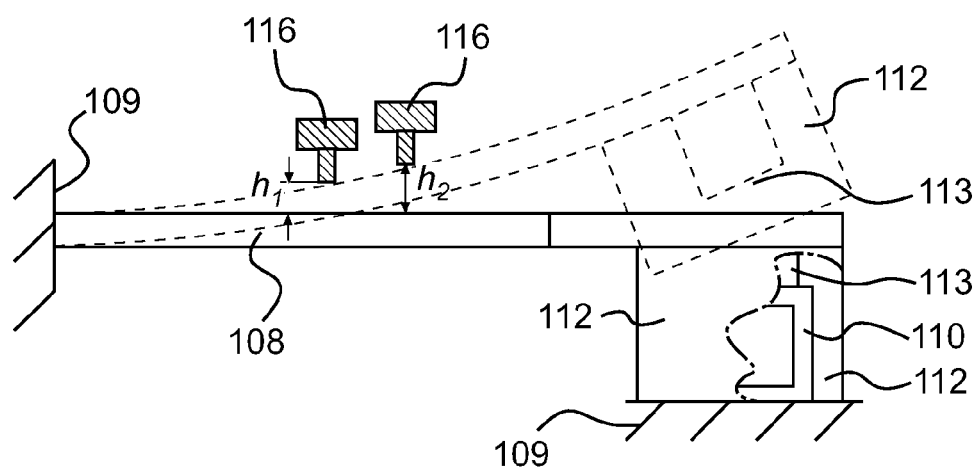
FIG. 10b is a side view of the electromagnetic MPG of FIG. 10a with a portion in phantom showing a position of the MPG when in contact with a stopper and with a partial cross-section showing the configuration at rest.
Figure 11:
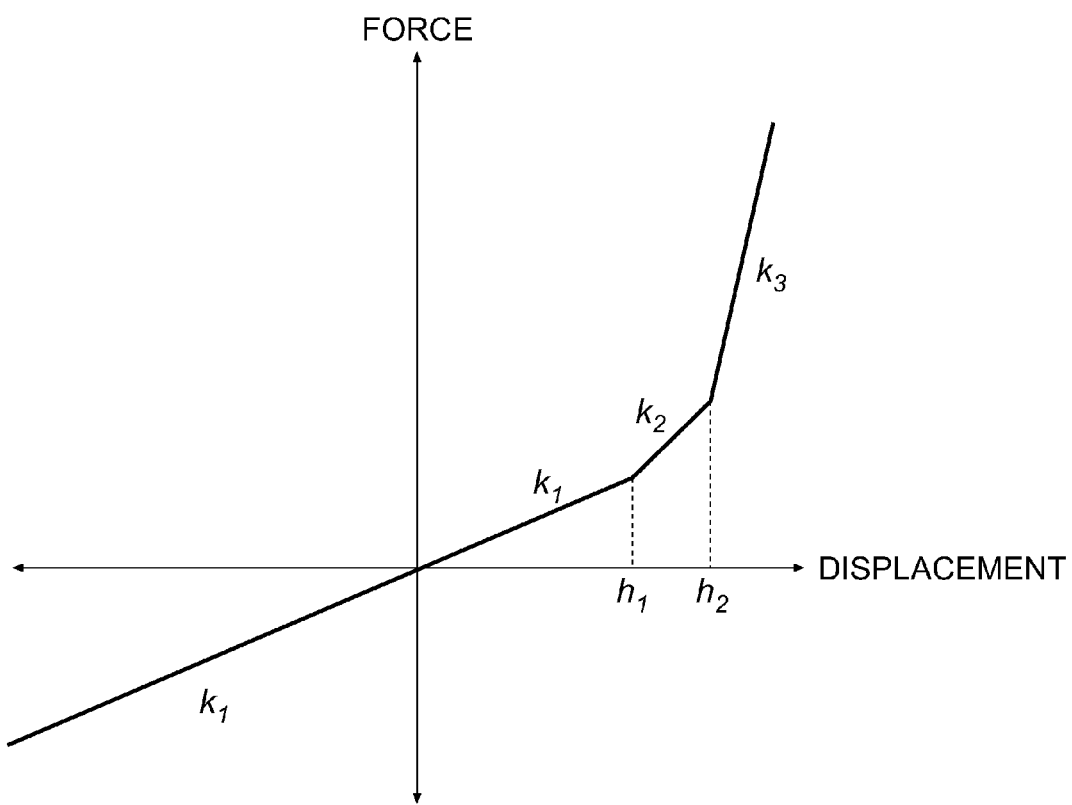
FIG. 11 is a plot illustrating the force versus displacement of a MPG according to the second embodiment of the invention.

Referring now to FIGS. 10a and 10b, a MPG designed according to a second embodiment of the invention will be described. In this second embodiment, two (or more) carriages 111 are used to place two (or more) stoppers 116 at different locations along the beam 108 $l_1$ and $l_2$ at two (or more) increasing heights $h_1$ and $h_2$ inside the envelope of motions of the beam 108, so that the beam 108 engages the two (or more) stoppers 116 progressively in three (or more) stages. The first stage is when the oscillation intensity is below a threshold corresponding to where the beam 108 does not contact the first stopper 116. The first stopper 116 is the stopper 116 closest to the base 109. The oscillator has then a first stiffness k1. When the vibrations reach a sufficient intensity, the beam 108 encounters the first stopper 116. The encounter of the beam 108 with the first stopper 116 constitutes the second stage. Upon contact with the first stopper 116, the beam 108 deflects. The beam 108 has its effective length reduced to L−l1, which in turn forces the oscillator into a second stiffness k2 greater than k1. If the vibrations intensity increases further, the beam 108 encounters a second stopper 116, and the oscillator enters in the third stage. The second stopper 116 is at a height h2 greater than the height h1 and at a location l2 greater than the location l1 of the first stopper 116 such that the contact between the beam 108 and the stoppers 116 is effectively happening in three stages. Upon contact with the second stopper 116, the beam 108 deflects even more, and the beam 108 has its effective length reduced to L−l1−l2, which in turn forces the oscillator into a third stiffness k3 greater than k2. The presence of the two stoppers 116 produces a tri-linear stiffness relationship (shown in FIG. 11). The harvesting element becomes a tri-linear oscillator, as opposed to a bi-linear oscillator for the first embodiment having a single stopper.

It is possible to create a piecewise-linear oscillator by having additional stoppers 116 located at increasing heights and lengths along the envelope of motion of the beam 108 so as to obtain an oscillator with a variable stiffness. Piecewise-linear oscillators (oscillators with two or more linear stiffness stages) exhibit resonance in a broad bandwidth in the neighbourhood of a natural frequency. The response of the piecewise-linear oscillator and linear oscillator (no stopper 116, prior art) are identical as long as the beam 108 does not engage one of the stoppers 116. When the beam 108 engages a stopper 116, the effective stiffness of the piecewise-linear oscillator increases in proportion to the interval the beam 108 spends engaged with the stopper 116 per cycle. The higher effective stiffness caps the beam 108-mass 104 amplitude at a lower level and increases the effective natural frequency of the oscillator causing the resonance of the piecewise-linear oscillator to persist over a wider band of the frequency spectrum than a linear oscillator. As a result, the bandwidth of a MPG equipped with a piecewise-linear oscillator expands to a larger band.

It is to be noted that a similar optimization methodology as seen in the first embodiment would apply to a MPG using a piecewise-linear oscillator, having a two or more stopper 116. Piecewise-linear oscillators are useful where it is not possible to reach a wide enough up-sweep bandwidth using a single stopper 116. This is due to design requirements placing restrictions on the localisation of the stopper 116. As an example, it is possible that the height ho of the stopper 116 could not be decreased enough to bring the stopper 116 closer to the beam 108.

Figure 12A:
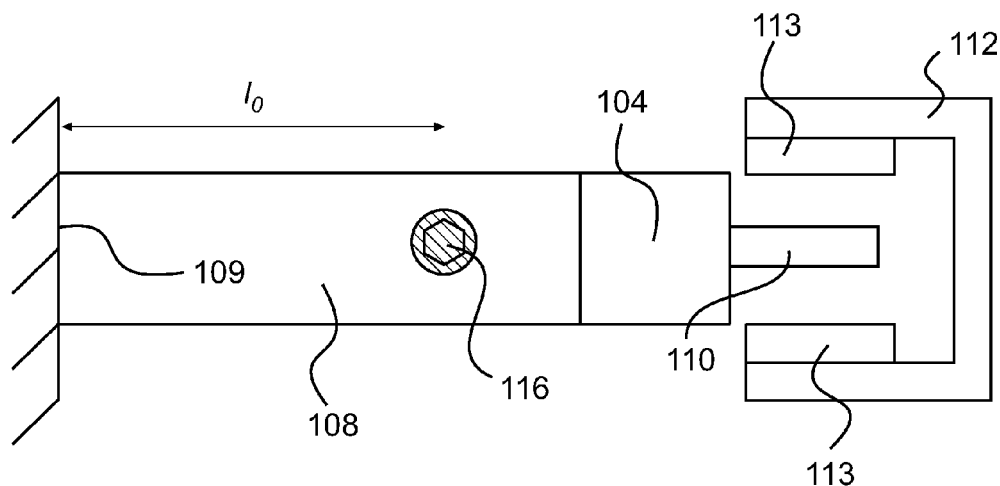
FIG. 12a is a top view of an electromagnetic MPG according to a third embodiment of the invention.
Figure 12B:
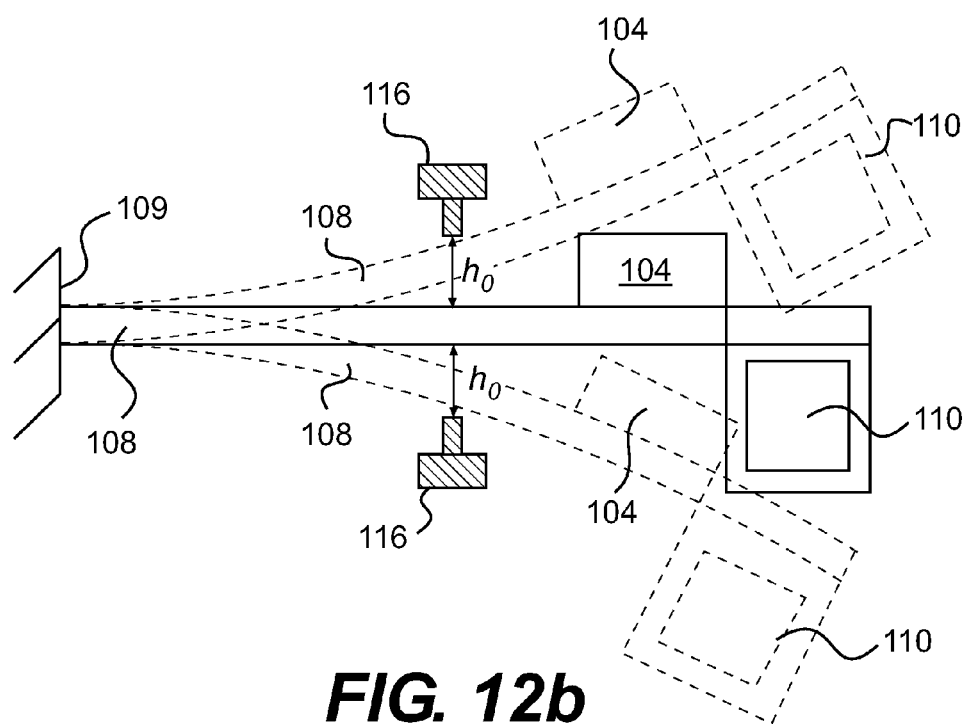
FIG. 12b is a side view of the electromagnetic MPG of FIG. 12a with a portion in phantom showing a position of the MPG when in contact with a stopper, and with a portion removed for clarity.
Figure 13:
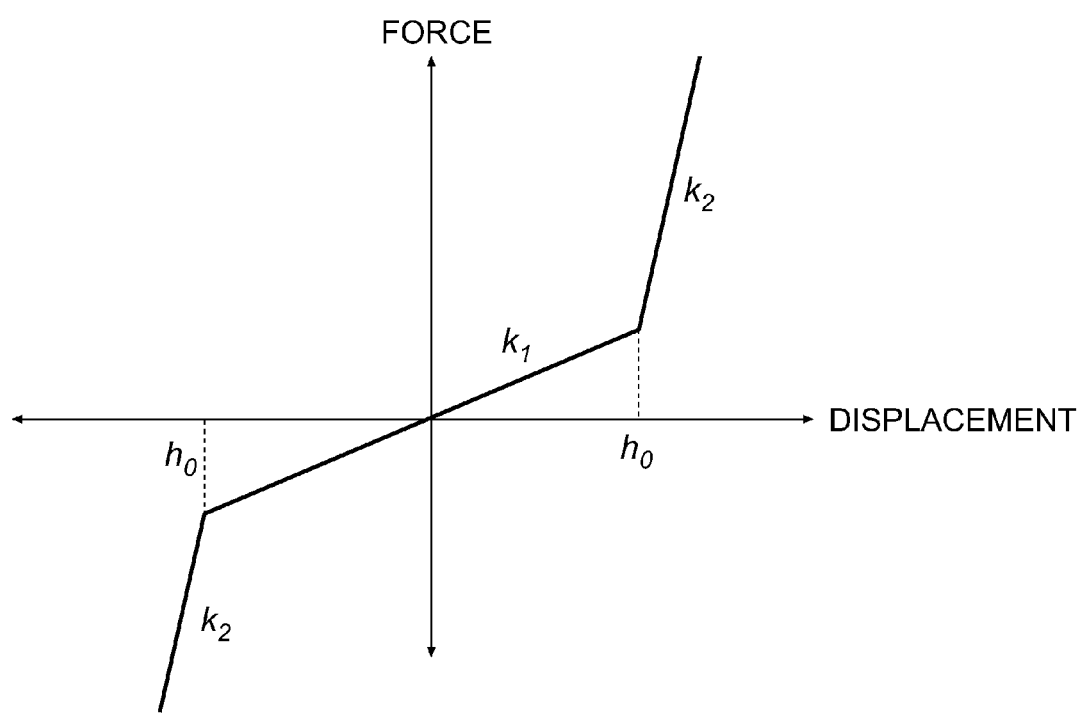
FIG. 13 is a plot illustrating the force versus displacement of a MPG according to the third embodiment of the invention.

Referring now to FIGS. 12a and 12b, a MPG designed according to a third embodiment of the invention will be described. In this third embodiment (bi-linear oscillator), two carriages 111 are used to place two stoppers 116 at the same location along the beam 108 on either side of the beam 108. This arrangement produces a symmetric bi-linear stiffness relationship (shown in FIG. 13).

Referring now to FIGS. 15a to 17b, MPGs designed according to a fourth embodiment of the invention will be described. In this fourth embodiment, a single stopper 116 is placed directly within the envelope of motion of the inertial mass 104.

Figure 15A:
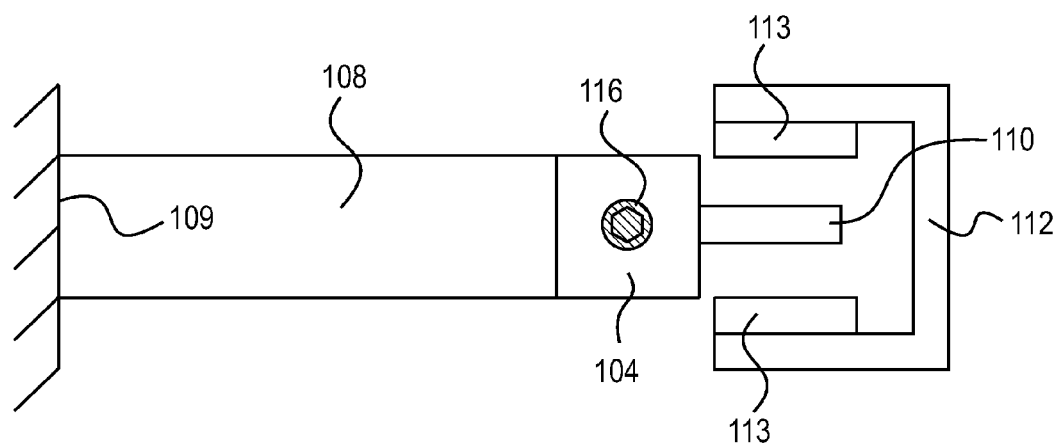
FIG. 15a is a top view of a first version of an electromagnetic MPG according to a fourth embodiment of the invention.
Figure 15B:
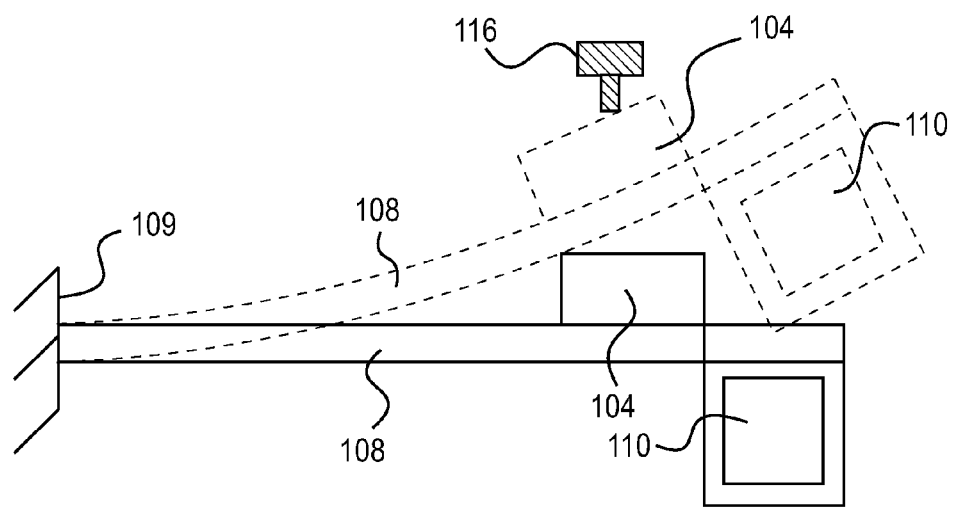
FIG. 15b is a side view of the electromagnetic MPG of FIG. 15a with a portion in phantom showing a position of the MPG when in contact with a stopper, and with a portion removed for clarity.
Figure 18:
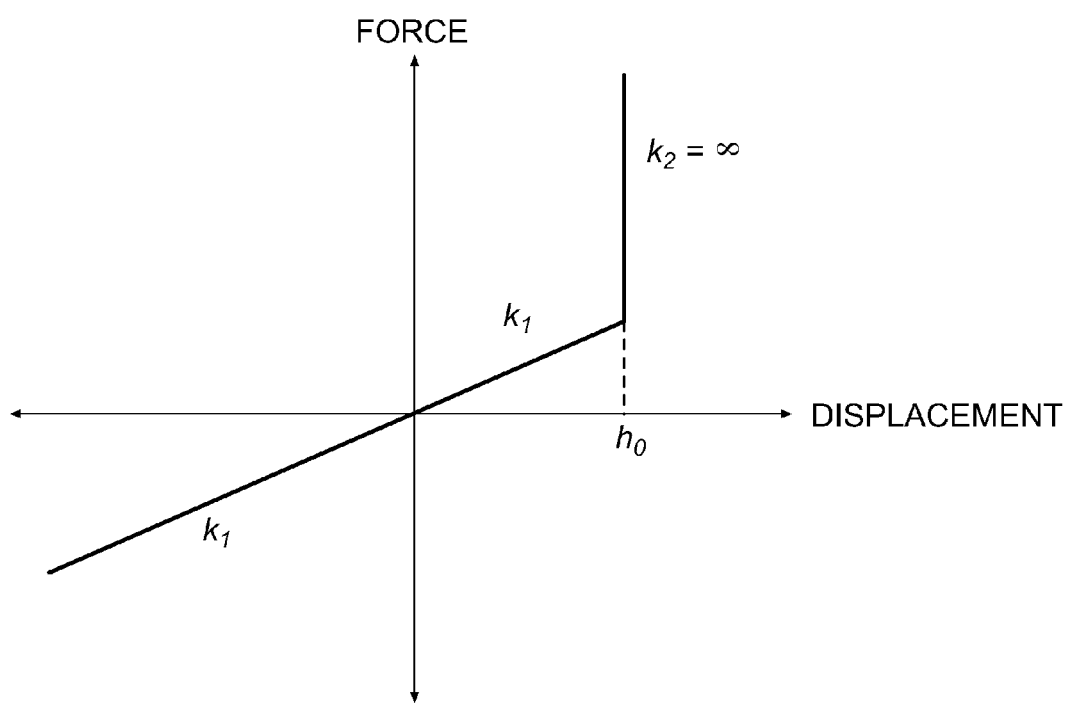
FIG. 18 is a plot illustrating the force versus displacement of a MPG according to the fourth embodiment of the invention.

A first version of an electromagnetic MPG according to the fourth embodiment of the invention is presented in FIGS. 15a and 15b. The MPG consists of the same elements as the electromagnetic MPG according to the first embodiment of the invention presented in FIGS. 5a and 5b, except that the stopper 116 is placed so as to interfere directly with the inertial mass 104 during its motion, as opposed to interfering with the cantilever beam 108. More specifically, the stopper 116 is placed at a fixed height ho and horizontal offset lo within the envelope of motion of the inertial mass 104. When the level of vibration is sufficient, the inertial mass 104 impacts the stopper 116 and thus terminates its motion in the direction of the stopper 116. As shown in FIG. 18, the impact induces a very large almost infinite stiffness. The beam 108-mass 104 oscillator according to this embodiment is a bi-linear impact oscillator, which is a limiting case for the bi-linear oscillators.

Figure 16A:
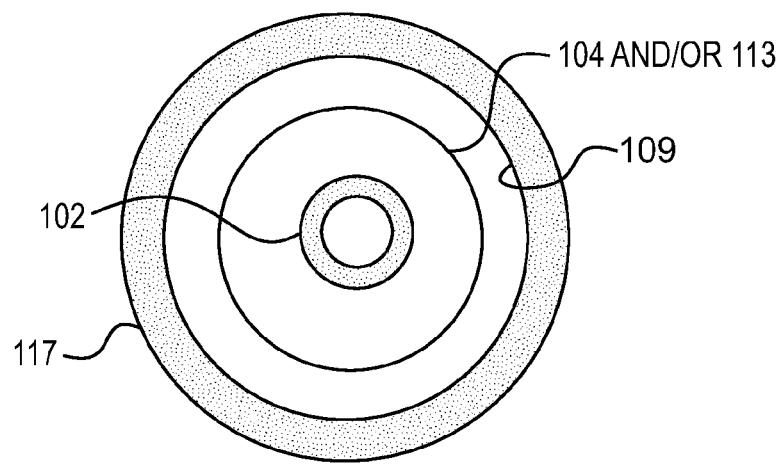
FIG. 16a is a top view of a second version of an electromagnetic MPG according to the fourth embodiment of the invention.
Figure 16B:
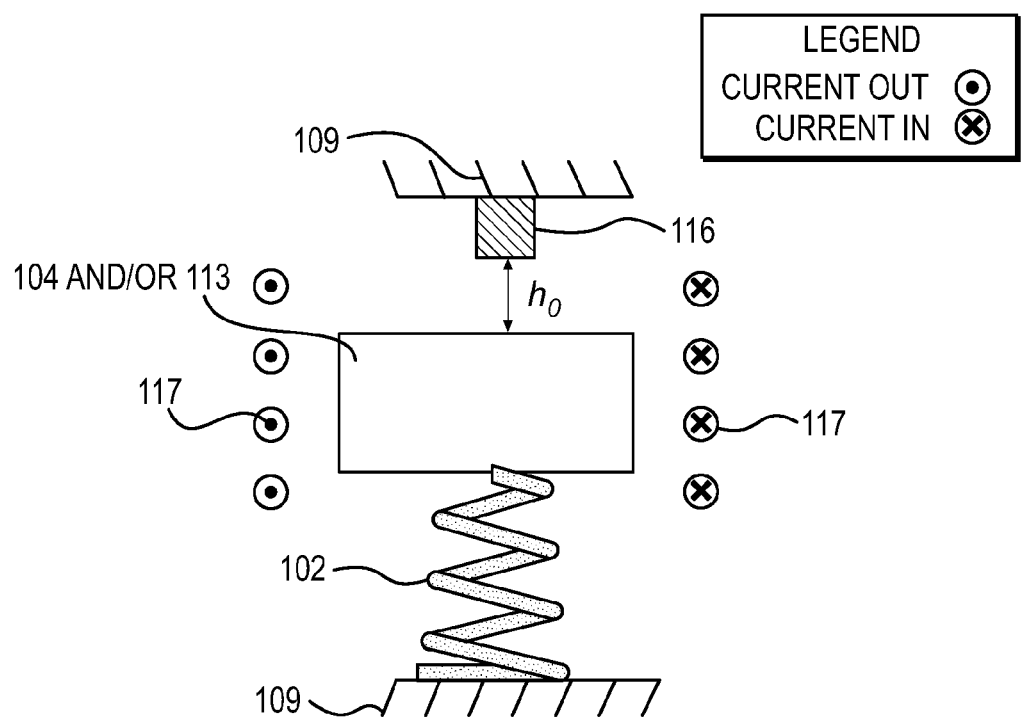

A second version of an electromagnetic MPG according to the fourth embodiment of the invention is presented in FIGS. 16a and 16b. In this alternative version, a single spring 102 is used instead of the cantilever beam 108. The spring 102 supports the magnet 113 which acts as the inertial mass 104 of the MPG. It is contemplated that any spring 119 with a hardening nonlinearity could be used to construct this MPG. The stopper 116 is placed on the upper part of the base 109 so as to contact the magnet 13 when the strike exceeds a threshold amplitude $h_o$.

Figure 17A:
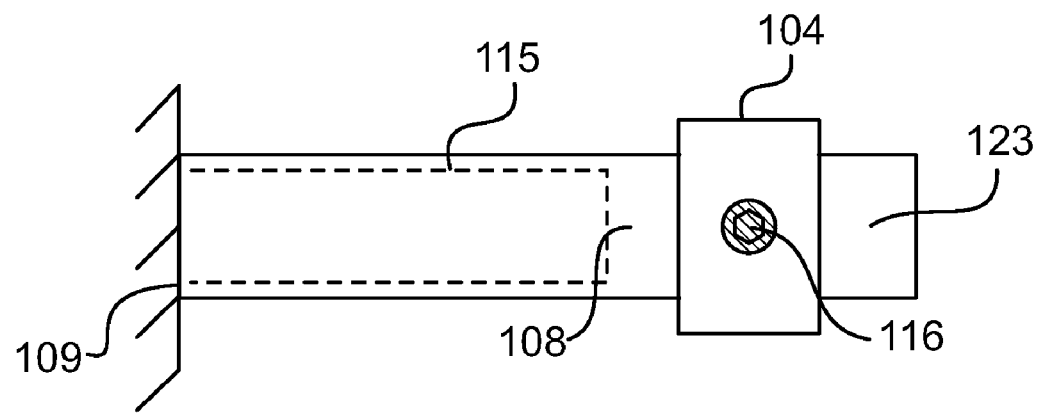
FIG. 17a is a top view of a piezoelectric MPG according to the fourth embodiment of the invention.
Figure 17B:
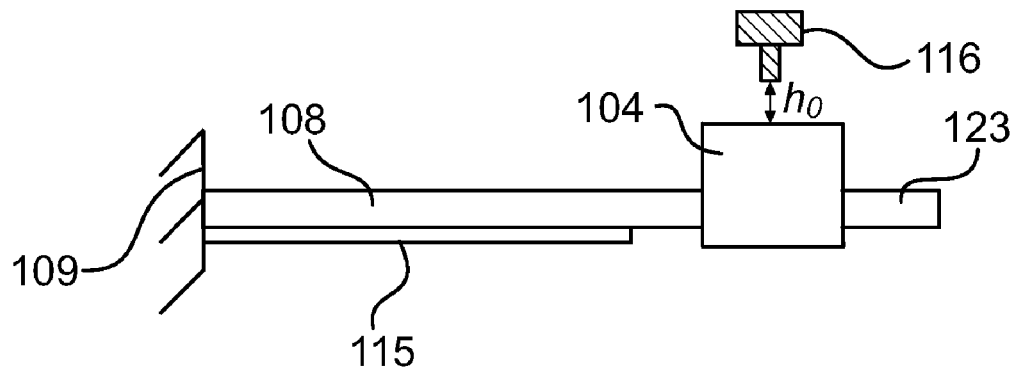

A piezoelectric MPG according to the fourth embodiment of the invention is shown in FIGS. 17a, and 17b. Similarly to the electromagnetic MPG according to the fourth embodiment, the rigid stopper 116 is placed directly within the envelope of motion of the inertial mass 104 of a piezoelectric MPG.

Figure 19A:
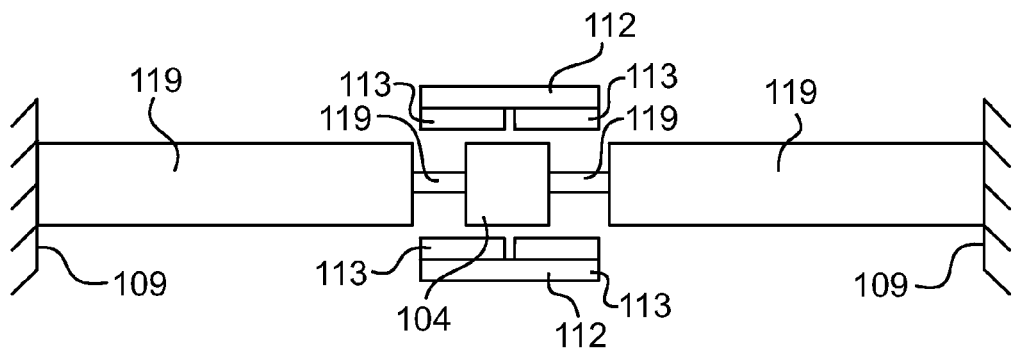
FIG. 19a is a top view of an electromagnetic MPG according to a fifth embodiment of the invention.
Figure 19B:
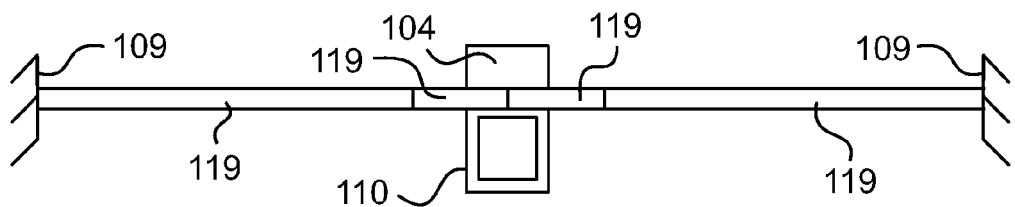
FIG. 19b is a side view of the electromagnetic MPG of FIG. 19a with a portion removed for clarity.
Figure 20:
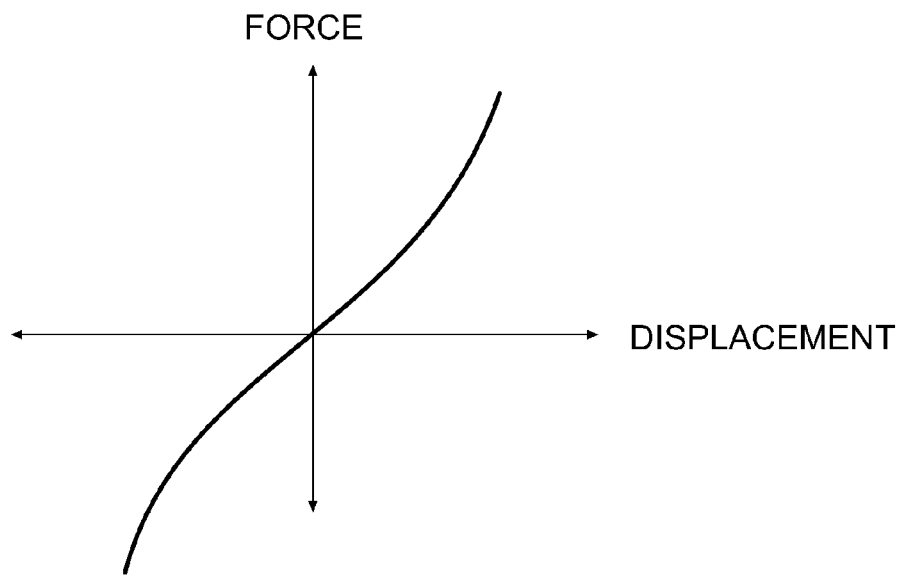
FIG. 20 is plot illustrating the force versus displacement of a MPG according to the fifth embodiment of the invention.

Referring now to FIGS. 19a and 19b, a MPG designed according to a fifth embodiment of the invention will be described. In this fifth embodiment, the inertial mass 104 is supported by a set of two (or more) symmetrically (or asymmetrically) arranged beams 119. The beams 119 are characterized by the fact that they have a cross-section which varies along a length of the beam 119. The beams 119 could alternatively be plates, or other tether-like structures. The immovable supports result in the tethers behaving as hardening-type springs with smoothly increasing stiffness as the displacement increases (as shown in FIG. 20). The harvesting element acquires a hardening-type nonlinearity and becomes a hardening-type oscillator.

Figure 21A:
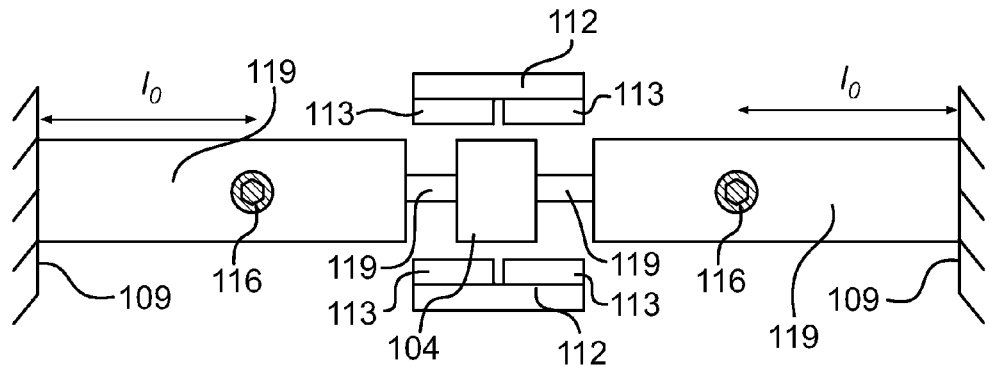
FIG. 21a is a top view of an electromagnetic MPG according to a sixth embodiment of the invention.
Figure 21B:
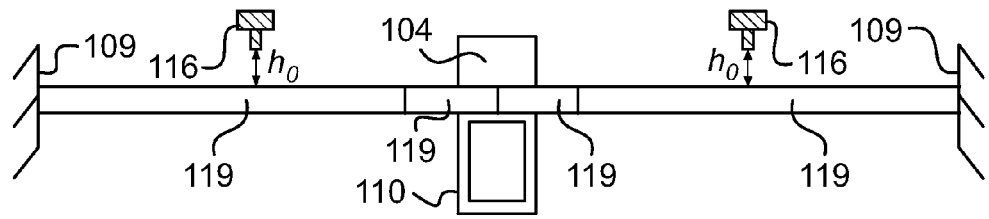
Figure 27:
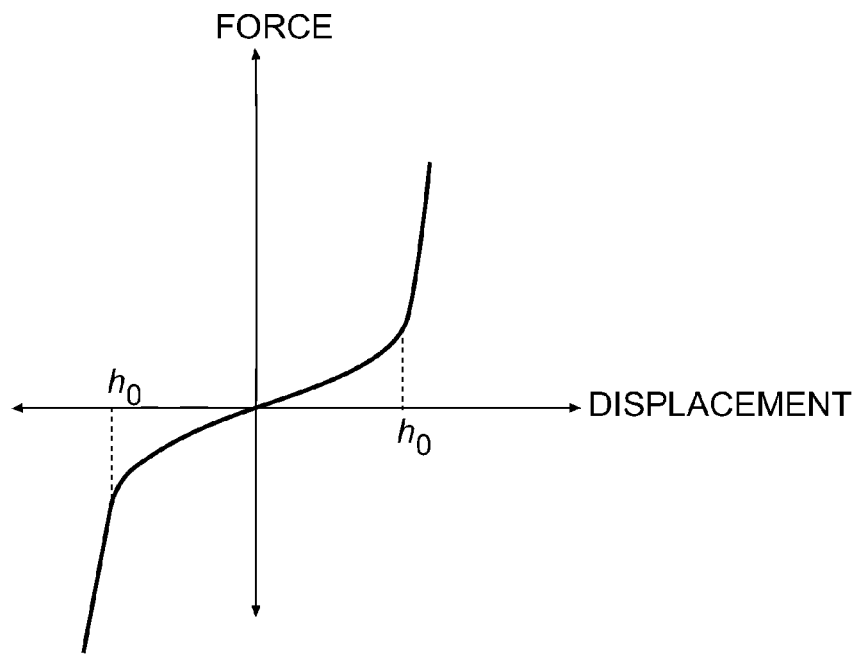
FIG. 27 is plot illustrating the force versus displacement of a MPG according to the sixth embodiment of the invention.

Referring now to FIGS. 21a and 21b, a MPG designed according to a sixth embodiment of the invention will be described. In this sixth embodiment, two (or more) symmetrically (or asymmetrically) arranged rigid stoppers 116 are placed above (or below) two (or more) beams 119 (or tethers) supporting the inertial mass 104 of an electromagnetic MPG. The beams 119 and stoppers 116 are used to create a two-stage (or more) nonlinear spring with two (or more) increasingly stiffer stages (such as shown in FIG. 27). The hardening-type nonlinearity of the harvesting element grows thereby enhancing the hardening-type behavior of the oscillator and further expanding the up-sweep bandwidth of the MPG.

Figure 22A:
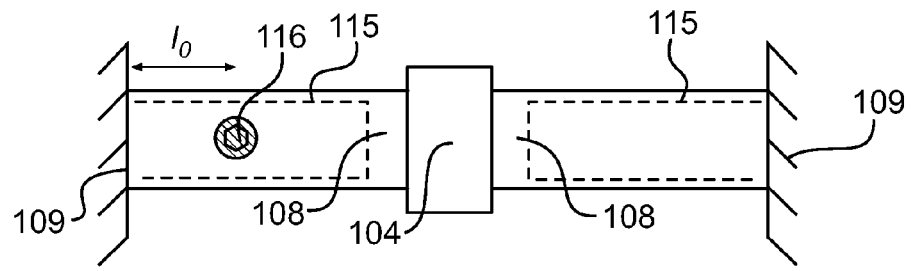
FIG. 22a is a top view of a piezoelectric MPG according to the sixth embodiment of the invention.
Figure 22B:
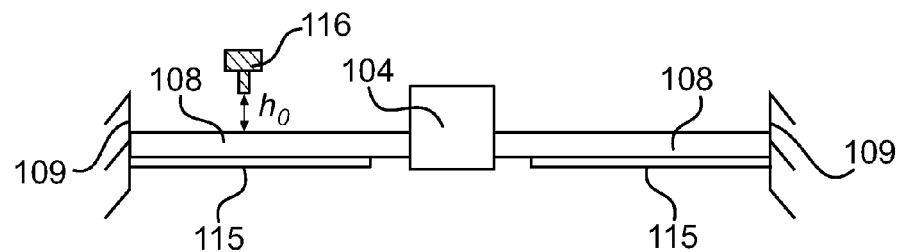

In a second version of the sixth embodiment of the invention, shown in FIGS. 22a and 22b, the MPG comprises a piezoelectric transduction mechanism. A single rigid stopper 116 is placed above (or below) one of the two beams 108 (or tethers) supporting the inertial mass 104. This configuration creates a two-stage nonlinear spring. As a result, the hardening-type nonlinearity of the harvesting element grows thereby enhancing the hardening-type behavior of the oscillator and further expanding the up-sweep bandwidth of the MPG.

Figure 23A:
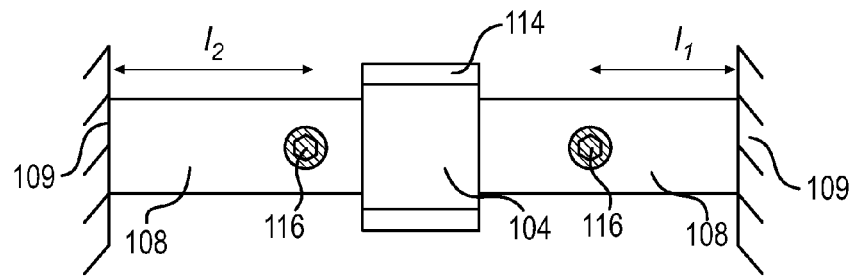
FIG. 23a is a top view of a first version of an electrostatic MPG according to the sixth embodiment of the invention.
Figure 23B:
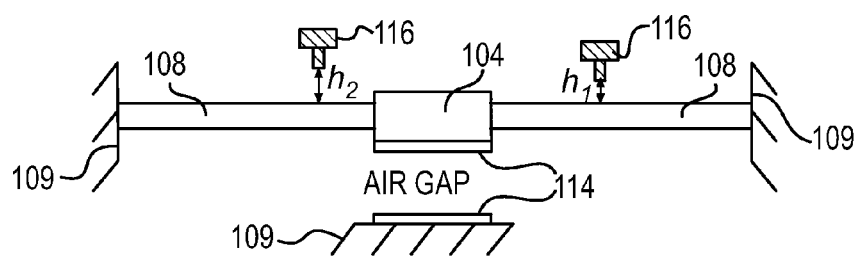

A third version of the sixth embodiment of the invention is shown in FIGS. 23a and 23b. In this third version, two rigid stoppers 116 are asymmetrically placed above (or below) two beams 108 (or tethers) supporting the inertial mass 104 of an electrostatic MPG. Each stopper 116 is placed within the envelope of motion of each beam 108 to create a three-stage nonlinear spring with three increasingly stiffer stages. As a result, the hardening-type nonlinearity of the harvesting element grows thereby enhancing the hardening-type behavior of the oscillator and further expanding the up-sweep bandwidth of the MPG.

Figure 24A:
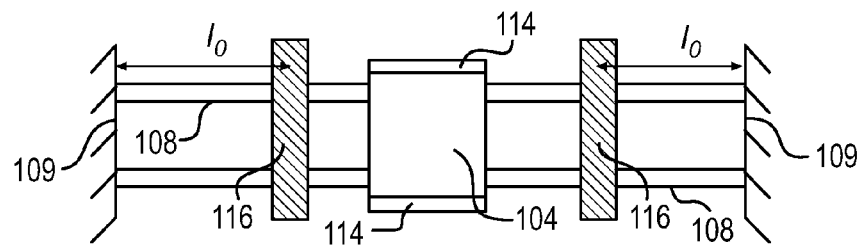
FIG. 24a is a top view of a second version an electrostatic MPG according to the sixth embodiment of the invention.
Figure 24B:
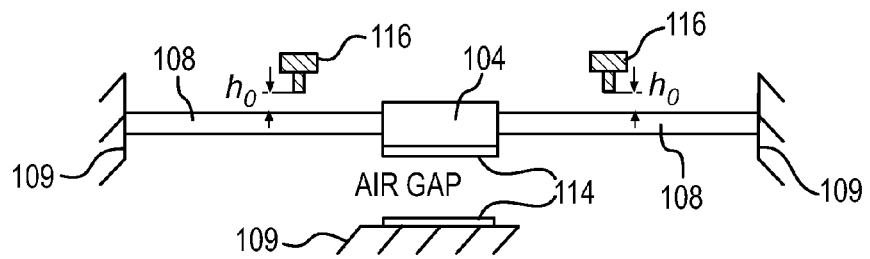

A fourth version of the sixth embodiment of the invention is shown in FIGS. 24a and 24b. In this fourth version, two ridges 116 (or more) are symmetrically (or asymmetrically) placed above (or below) two of four beams 108 (or tethers) supporting the inertial mass 104 of an electrostatic MPG. The ridges 116 interfere within the envelope of motion of the pair of beams 108 and create a two (or more) stage nonlinear spring with two (or more) increasingly stiffer stages. As a result, the hardening-type nonlinearity of the harvesting element grows thereby enhancing the hardening-type behavior of the oscillator and further expanding the up-sweep bandwidth of the MPG.

A fifth version of the sixth embodiment of the invention is shown in FIGS. 25a and 25b. In this fifth version, four rigid stoppers 116 are symmetrically placed above and below two beams 108 (or tethers) supporting the inertial mass 104 of an electrostatic MPG. The rigid stoppers 116 interfere within the envelope of motion of the beams 108 to create a two-stage nonlinear spring. As a result, the hardening-type nonlinearity of the harvesting element grows thereby enhancing the hardening-type behavior of the oscillator and further expanding the up-sweep bandwidth of the MPG. Alternatively, it is contemplated that the inertial mass 104 could be placed on a single beam 108 connected at both ends to the base 109 instead of the two beams 108.

Figure 26A:
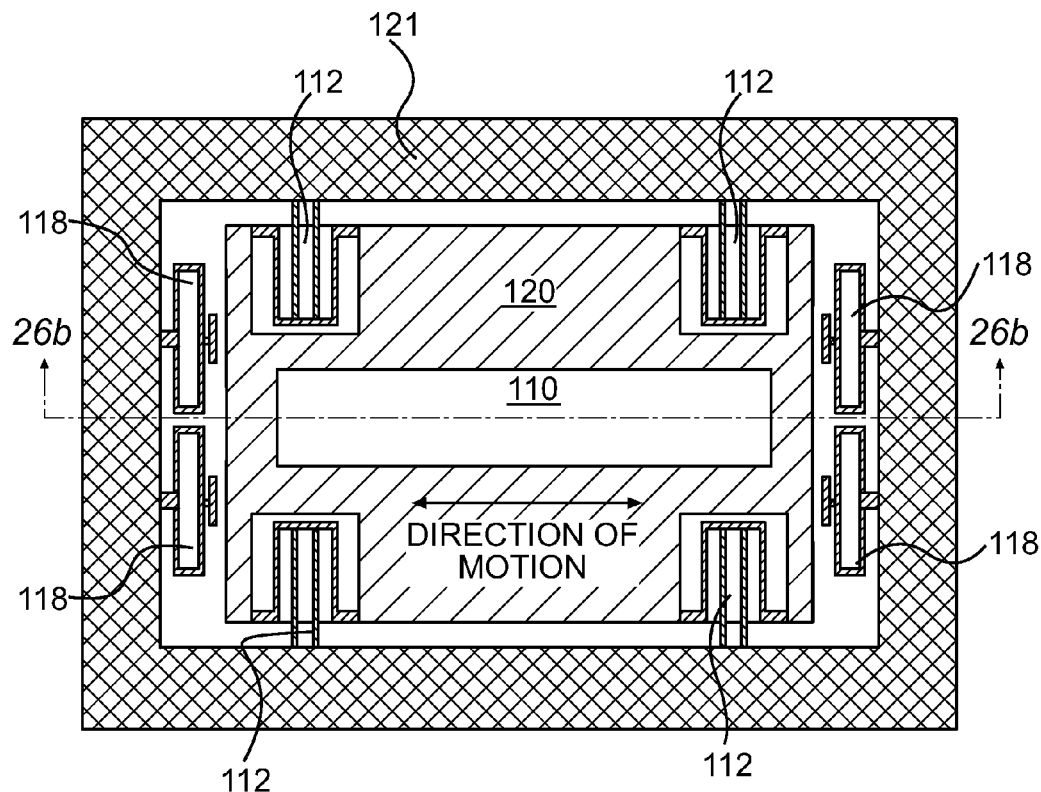
FIG. 26a is a top view of an electromagnetic MPG using the micro-electro-mechanical system (MEMS) technology according to the sixth embodiment of the invention
Figure 26B:
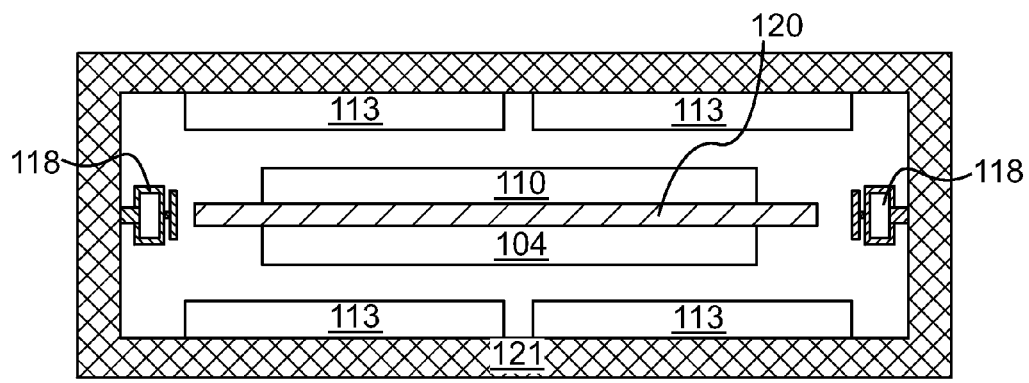

A sixth version of the sixth embodiment of the invention is shown in FIGS. 26a and 26b. In this sixth version, four flexible end stoppers 118 are placed two at either end of the stroke of an electromagnetic MPG fabricated using micro-electro-mechanical system (MEMS) technology. The inertial mass 104 is supported by four beams 112 (or tethers) connected to a plate 120, and can engage the flexible end-stoppers 118. The end-stoppers 118 add another stage to the hardening nonlinear spring of the freely moving inertial mass 104 (FIG. 10) resulting from the four restrained tethers 112. The MPG under this arrangement has a symmetric two-stage nonlinear spring like that shown in FIG. 27. As a result, the hardening-type nonlinearity of the harvesting element grows thereby enhancing the hardening-type behavior of the oscillator and further expanding the up-sweep bandwidth of the MPG. This arrangement of the sixth embodiment is well suited for MPGs fabricated using micro-electro-mechanical systems fabrication technology.

Figure 28A:
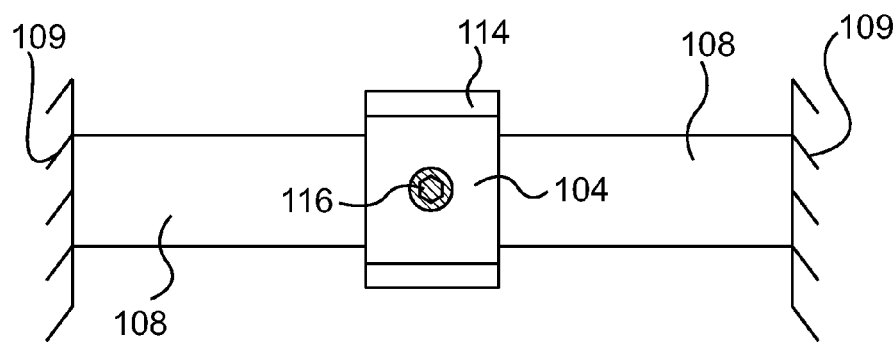
FIG. 28a is a top view of an electrostatic MPG according to a seventh embodiment of the invention.
Figure 28B:
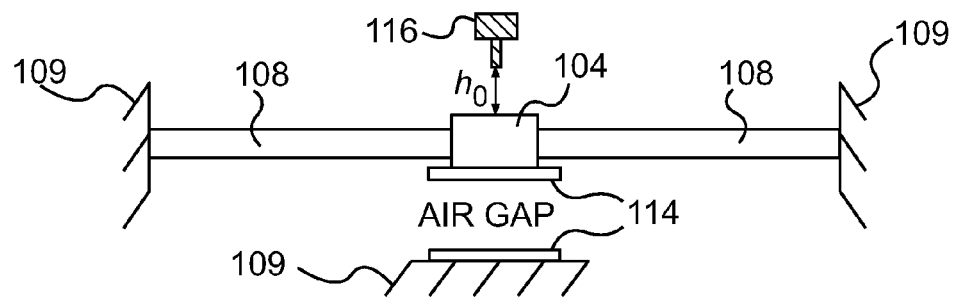
Figure 30:
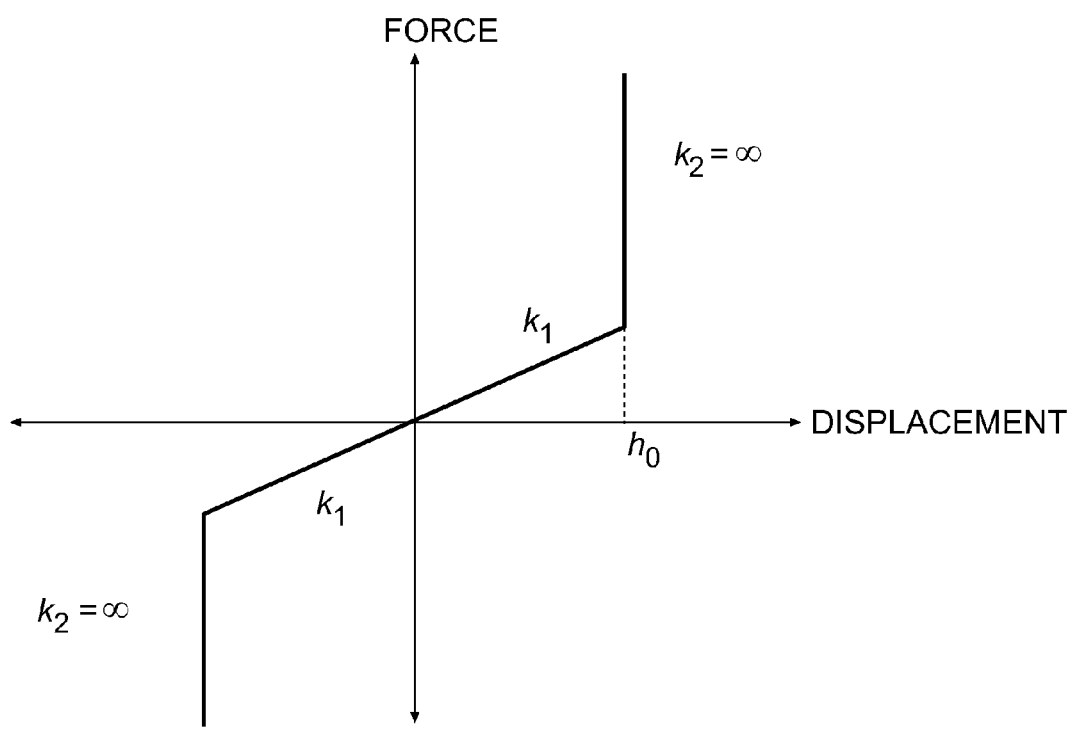
FIG. 30 is a plot illustrating the force versus displacement of a MPG according to the seventh embodiment of the invention.

Referring now to FIGS. 28a and 28b, a MPG designed according to a seventh embodiment of the invention will be described. In this seventh embodiment, one rigid stopper 116 is placed above (or below) the inertial mass 104 of an electrostatic MPG supported by two (or more) beams 108 (or tethers). The rigid stopper 116 adds an infinite stiffness wall on one side of the smooth nonlinear spring created by the tethers as shown in FIG. 30. The hardening-type oscillator becomes an impact oscillator which expands the up-sweep bandwidth of the MPG to its maximum value.

Figure 29A:
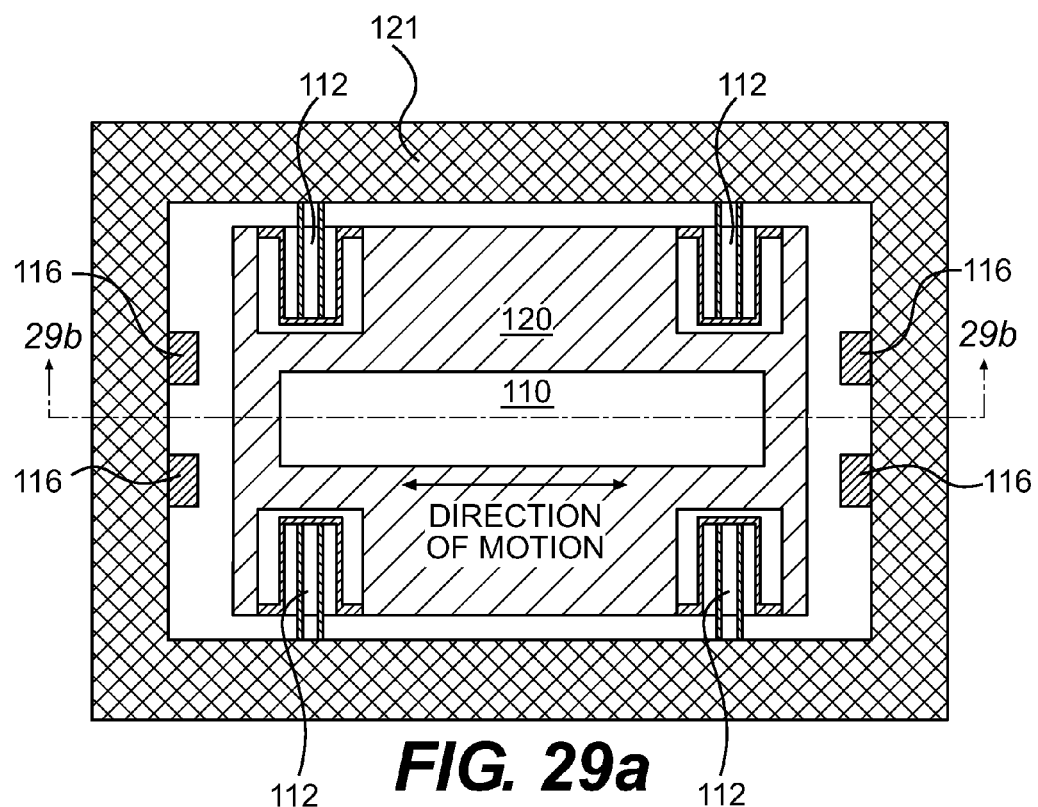
FIG. 29a is a top view of an electromagnetic MPG using the MEMS technology according to the seventh embodiment of the invention.
Figure 29B:
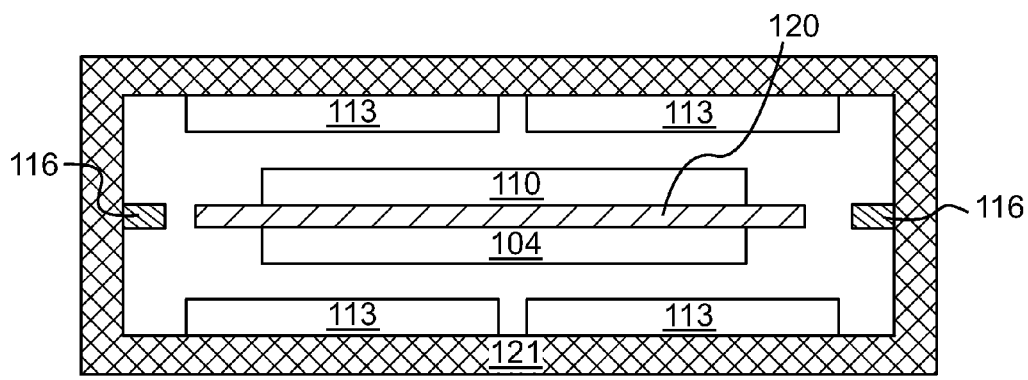

A second version of the seventh embodiment of the invention is shown in FIGS. 29a and 29b. In this second version, two rigid end-stoppers 116 are placed at either end of the stroke of an electromagnetic MPG fabricated the MEMS technology. The stoppers 116 add an infinite stiffness wall on either side of the smooth nonlinear spring created by the tethers. In this configuration, the hardening-type oscillator becomes an impact oscillator which expands the up-sweep bandwidth of the MPG to its maximum value.

It is contemplated that various combinations of the above and other bi-linear, piecewise-linear, and nonlinear springs of the hardening-type could be assembled that could be used to support the inertial mass 104 of the harvesting element in an electromagnetic, electrostatic or piezoelectric MPG.

Modifications and improvement to the above described embodiments of the present invention may become apparent to those skilled in the art. The foregoing description is intended to be exemplary rather than limiting. Furthermore, the dimensions of features of various components that may appear on the drawings are not meant to be limiting, and the size of the components therein can vary from the size that may be portrayed in the figures herein. The scope of the present invention is therefore intended to be limited solely by the scope of the appended claims.

What is claimed is:

1. A vibration-based power generator comprising:
   a base;
   a variable stiffness oscillator connected to the base, the oscillator comprising an inertial mass, the inertial mass moving relative to the base in response to vibrations transmitted to the base,
   the oscillator having a neutral position corresponding to a position of the oscillator relative to the base when no vibrations are transmitted to the base,
   the oscillator being movable to a first position where the inertial mass is at a first distance in a first direction from a position of the inertial mass when the oscillator is at the neutral position,
   the oscillator being movable to a second position where the inertial mass is at a second distance in the first direction from the position of the inertial mass when the oscillator is at the neutral position, the second distance being greater than the first distance,
   a stiffness of the oscillator at the second position being greater than a stiffness of the oscillator at the first position; and
   an electric energy transducer associated with the oscillator, the electric energy transducer generating electric power in response to movement of the inertial mass relative to the base.

2. The vibration-based power generator of claim 1, wherein the electric energy transducer has at least a portion connected to the oscillator.

3. The vibration-based power generator of claim 2, wherein the electric energy transducer is an electromagnetic transducer comprising at least one magnet and a coil, one of the at least one magnet and the coil being connected to the base, and an other one of the at least one magnet and the coil being connected to the oscillator.

4. The vibration-based power generator of claim 3, wherein the inertial mass is formed by the at least one magnet.

5. The vibration-based power generator of claim 2, wherein the electric energy transducer is an electrostatic transducer comprising a capacitor having first and second capacitor plates, the first capacitor plate is connected to the base, and the second capacitor plate is connected to the oscillator and generally faces the first capacitor plate.

6. The vibration-based power generator of claim 2, wherein the electric energy transducer is a piezoelectric transducer comprising a piezoelectric patch connected to the oscillator.

7. The vibration-based power generator of claim 1, wherein the oscillator further comprises at least one spring connected to the inertial mass, the spring having one end connected to the base.

8. The vibration-based power generator of claim 7, wherein the oscillator further comprises at least one stopper, the inertial mass contacting the at least one stopper when the oscillator is in the second position.

9. The vibration-based power generator of claim 8, wherein the inertial mass forms a portion of the electric energy transducer.

10. The vibration-based power generator of claim 8, wherein the at least one stopper is a spring.

11. The vibration-based power generator of claim 1, wherein the base houses the oscillator; and
the oscillator further comprises a plate connected to the inertial mass and at least one stopper, the plate being connected to the base via at least a pair of springs, and the plate contacting the at least one stopper when the oscillator is in the second position.

12. The vibration-based power generator of claim 1, wherein the oscillator further comprises a beam connected to the inertial mass, the beam having one end connected to the base.

13. The vibration-based power generator of claim 12, wherein the beam is at least two beams.

14. The vibration-based power generator of claim 12, wherein the beam has a cross-section which varies along a length of the beam.

15. The vibration-based power generator of claim 12, wherein the oscillator further comprises a first stopper, the beam contacting the first stopper when the oscillator is in the second position.

16. The vibration-based power generator of claim 15, wherein the at least one stopper is supported by a movable carriage.

17. The vibration-based power generator of claim 12, wherein the oscillator further comprises a first stopper; and the beam further comprises a ledge extending from the inertial mass, the ledge contacting the first stopper when the oscillator is in the second position.

18. The vibration-based power generator of claim 12, wherein the oscillator further comprises a first stopper; and the first stopper contacts the inertial mass when the oscillator is in the second position.

19. The vibration-based power generator of claim 15, wherein the oscillator is movable to a third position where the inertial mass is at a third distance in the first direction from the position of the inertial mass when the oscillator is at the neutral position, the third distance being greater than the second distance,
a stiffness of the oscillator at the third position being greater than a stiffness of the oscillator at the second position; and
the oscillator further comprises a second stopper, the beam contacting the second stopper when the oscillator is in the third position.

20. The vibration-based power generator of claim 19, wherein the beam comprises at least two beams.

21. The vibration-based power generator of claim 15, wherein the oscillator is movable to a third position where the inertial mass is at a third distance in a second direction from the position of the inertial mass when the oscillator is at the neutral position,
the oscillator is movable to a fourth position where the inertial mass is at a fourth distance in the second direction from the position of the inertial mass when the oscillator is at the neutral position, the fourth distance being greater than the third distance,
a stiffness of the oscillator at the fourth position being greater than a stiffness of the oscillator at the third position; and
the oscillator further comprises a second stopper, the beam contacting the second stopper when the oscillator is in the fourth position.

22. The vibration-based power generator of claim 21, wherein the beam is a first beam;
the oscillator further comprises a second beam,
the oscillator is movable to a fifth position where the inertial mass is at a fifth distance in the first direction from the position of the inertial mass when the oscillator is at the neutral position,
the oscillator is movable to a sixth position where the inertial mass is at a sixth distance in the first direction from the position of the inertial mass when the oscillator is at the neutral position, the sixth distance being greater than the fifth distance,
a stiffness of the oscillator at the sixth position being greater than a stiffness of the oscillator at the fifth position,
the oscillator is movable to a seventh position where the inertial mass is at a seventh distance in the second direction from the position of the inertial mass when the oscillator is at the neutral position,
the oscillator is movable to an eighth position where the inertial mass is at an eighth distance in the second direction from the position of the inertial mass when the oscillator is at the neutral position, the eighth distance being greater than the seventh distance;
a stiffness of the oscillator at the eighth position being greater than a stiffness of the oscillator at the seventh position; and
the oscillator further comprises a third stopper and a fourth stopper, the second beam contacting the third stopper when the oscillator is in the sixth position, the second beam contacting the fourth stopper when the oscillator is in the eighth position.

23. A method of optimizing a vibration-based power generator, the vibration-based power generator having a variable stiffness oscillator, the method comprising:
obtaining a probability density function of vibrations of an environment in which the vibration-based power generator is to operate;
obtaining a frequency-response function of the vibration-based power generator;
obtaining a figure of merit for the probability density function of vibrations of the environment by convoluting the probability density function of vibrations of the environment with the frequency-response function of the vibration-based power generator; and
adjusting the variable stiffness oscillator so as to optimize the figure of merit.

24. The method of claim 23, wherein adjusting the variable stiffness oscillator so as to optimize the figure of merit includes obtaining a figure of merit for different configurations of the variable stiffness oscillator, constituting a family of figures of merit, and selecting an absolute optimal from the family of figures of merit.

25. The method of claim 23, wherein adjusting the variable stiffness oscillator so as to optimize the figure of merit includes obtaining a figure of merit for different configurations of the variable stiffness oscillator, constituting a family of figures of merit, and selecting a suboptimal from the family of figures of merit, the suboptimal having a wider range of frequencies than an absolute optimal of the family of figures of merit.

26. The method of claim 23, wherein the variable stiffness oscillator comprises:
   a cantilever beam connected to an inertial mass and having one end connected to a base; and
   a stopper for contacting one of the inertial mass and the cantilever beam at a point of impact while the cantilever beam is moving relative to the base;
   wherein adjusting the variable stiffness oscillator based on the figure of merit includes adjusting a position of the stopper along the cantilever beam.

27. The method of claim 26, wherein the variable stiffness oscillator is further adjusted by selecting a distance of the stopper to the cantilever beam that minimizes a velocity of the cantilever beam at the point of impact.

28. The vibration-based power generator of claim 1, wherein the variable stiffness oscillator is a piecewise-linear oscillator.

* * * * *